US011536244B2

United States Patent
Wilson et al.

(10) Patent No.: US 11,536,244 B2
(45) Date of Patent: Dec. 27, 2022

(54) WATER-DRIVEN ELONGATED-CONVEYOR TURBINE AND METHOD OF USING A WATER-DRIVEN ELONGATED-CONVEYOR TURBINE

(71) Applicants: Michael W. N. Wilson, Aberdeenshire (GB); Stuart P. Moir, Stonehaven (GB)

(72) Inventors: Michael W. N. Wilson, Aberdeenshire (GB); Stuart P. Moir, Stonehaven (GB)

( * ) Notice: Subject to any disclaimer, the term of this patent is extended or adjusted under 35 U.S.C. 154(b) by 0 days.

(21) Appl. No.: 16/787,769

(22) Filed: Feb. 11, 2020

(65) Prior Publication Data

US 2021/0246865 A1    Aug. 12, 2021

(51) Int. Cl.
  *F03B 17/06*    (2006.01)
  *E02B 9/00*    (2006.01)
  (Continued)

(52) U.S. Cl.
  CPC .............. *F03B 17/061* (2013.01); *E02B 9/00* (2013.01); *F03B 13/264* (2013.01);
  (Continued)

(58) Field of Classification Search
  CPC ........ E02B 9/00; F03B 13/264; F03B 17/068; F03B 13/10; F03B 17/063; F05B 2210/16;
  (Continued)

(56) References Cited

U.S. PATENT DOCUMENTS

| 91,196 A | 6/1869 | Zink |
|---|---|---|
| 675,929 A | 6/1901 | Brown |

(Continued)

FOREIGN PATENT DOCUMENTS

| DE | 3338132 A1 | 5/1985 |
|---|---|---|
| DE | 29610286 U1 | 3/1997 |

OTHER PUBLICATIONS

Presentation at 7th European Wave and Tidal Energy Conference, Porto, Portugal, 2007—"Development of a floating tidal energy system suitable for use in shallow water," S. R. Turnock, et al.
(Continued)

*Primary Examiner* — Shafiq Mian
(74) *Attorney, Agent, or Firm* — GableGotwals

(57) ABSTRACT

A water-driven turbine has an elongated endless conveyor with down and up streaming straightaways connected by travel-reversing turns. Paddles mounted on the conveyor present high resistance to waterflow on the downstream straightaway and low resistance to waterflow or the atmosphere on the upstream straightaway, the differential allowing the flow of water to continuously drive the conveyor which is connected to a power take-off shaft facilitating connection to a variety of energy-harnessing systems. The turbine can be towed, self-driven or mooring line manipulated to a flow site and is operable in unidirectional flows such as rivers and reversing flows such as tides at depths from surface to bottom. The paddles can be mounted or changed on shore, at the flow site and anywhere in between. The turbine is efficient in low and high velocity water flow, not easily damaged by floating debris, cavitation free and fish, mammal and environmentally friendly.

3 Claims, 10 Drawing Sheets

(51) Int. Cl.
*F03B 13/26* (2006.01)
*F03B 13/10* (2006.01)

(52) U.S. Cl.
CPC ............ *F03B 17/068* (2013.01); *F03B 13/10* (2013.01); *F03B 17/063* (2013.01); *F05B 2210/16* (2013.01); *F05B 2240/40* (2013.01); *F05B 2240/93* (2013.01); *F05B 2240/97* (2013.01)

(58) Field of Classification Search
CPC .............. F05B 2240/40; F05B 2240/93; F05B 2240/97
See application file for complete search history.

(56) References Cited

U.S. PATENT DOCUMENTS

| | | | | |
|---|---|---|---|---|
| 3,927,330 A | * | 12/1975 | Skorupinski | F03B 17/066 415/5 |
| 4,772,237 A | * | 9/1988 | Zalkauskas | B63H 1/34 D12/306 |
| 5,033,332 A | * | 7/1991 | Riley | B07B 13/116 75/712 |
| 5,136,174 A | * | 8/1992 | Simoni | F03B 17/062 290/43 |
| 7,240,631 B1 | * | 7/2007 | Al-Babtain | B63B 11/04 114/125 |
| 7,980,907 B1 | * | 7/2011 | Chippas | B63H 16/12 440/97 |
| 8,534,057 B1 | * | 9/2013 | Brown | F03B 17/068 415/5 |
| 2006/0019553 A1 | * | 1/2006 | Voves | F03B 17/064 440/3 |
| 2011/0198857 A1 | * | 8/2011 | Becker | F03D 5/02 290/55 |
| 2015/0042097 A1 | * | 2/2015 | Cunnane | F03B 13/00 290/54 |

OTHER PUBLICATIONS

Article entitled, "Field Measurements of a Full Scale Tidal Device," P. Jeffcoate, et al. International Journal of Marine Energy, 12, 3-20, https://doi.org/10.1016/j.ijome.2015.04.002.

* cited by examiner

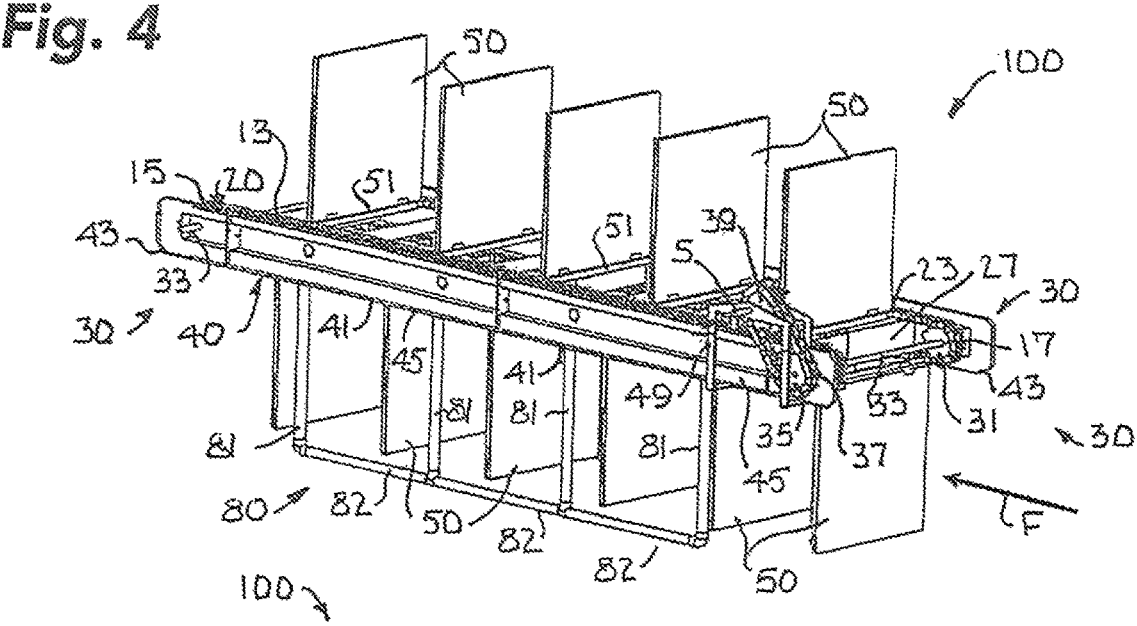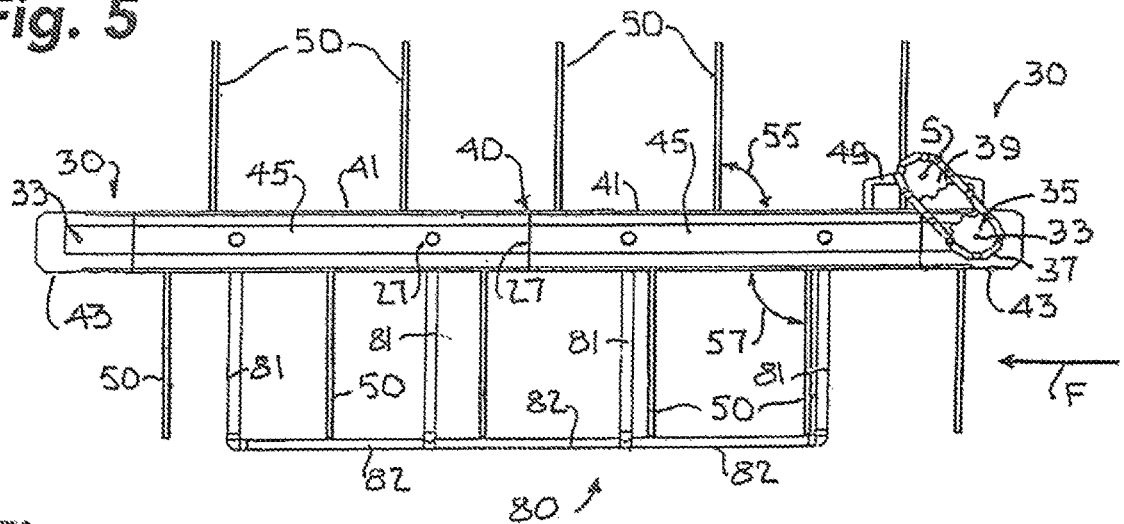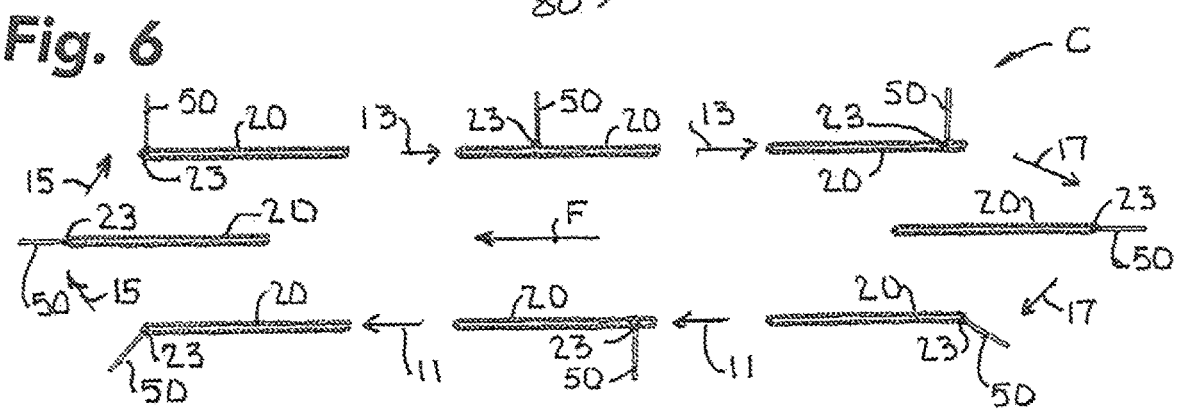

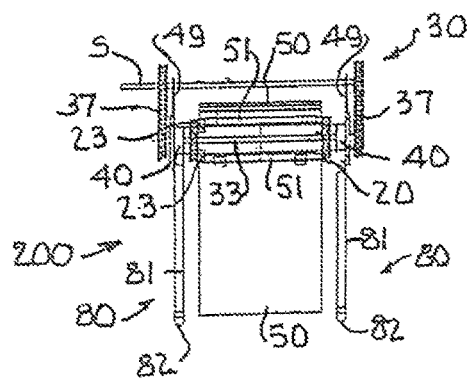
Fig. 10
Fig. 11
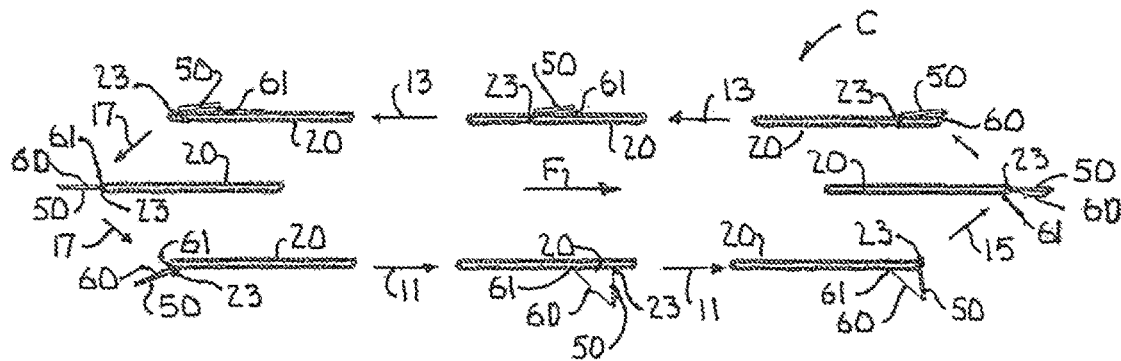
Fig. 12
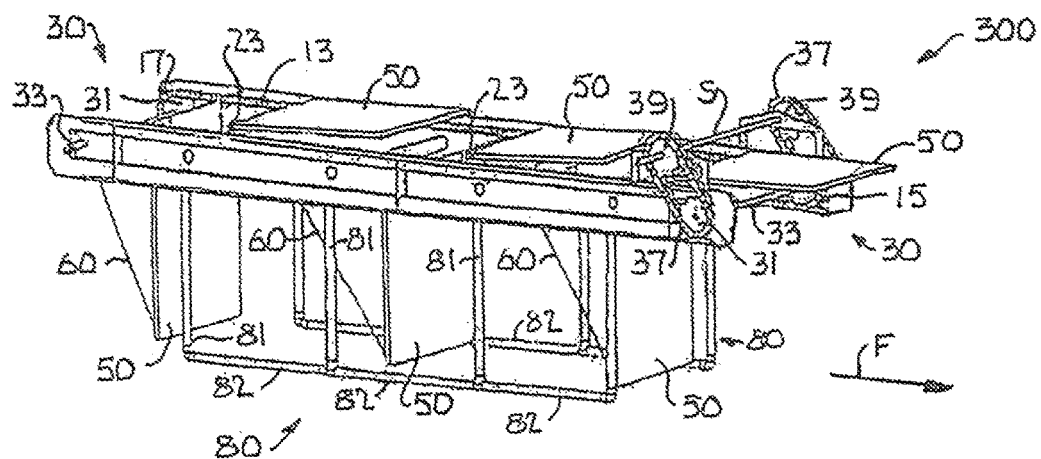

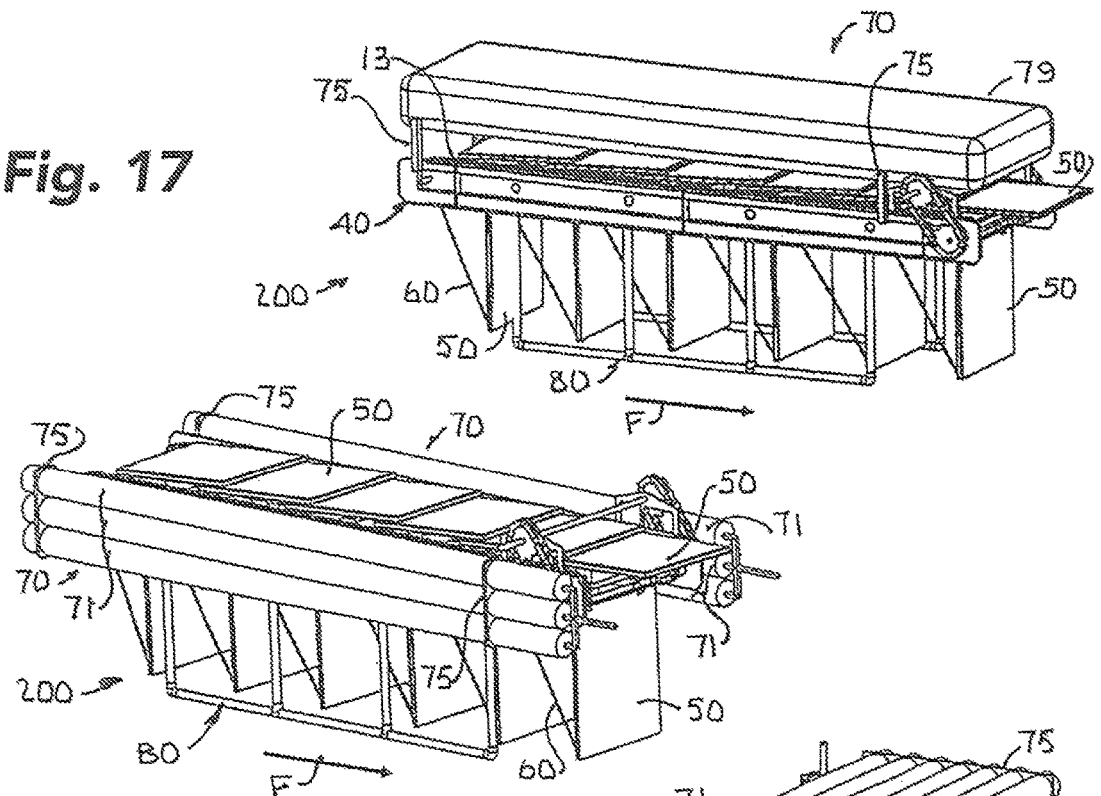
Fig. 17
Fig. 18
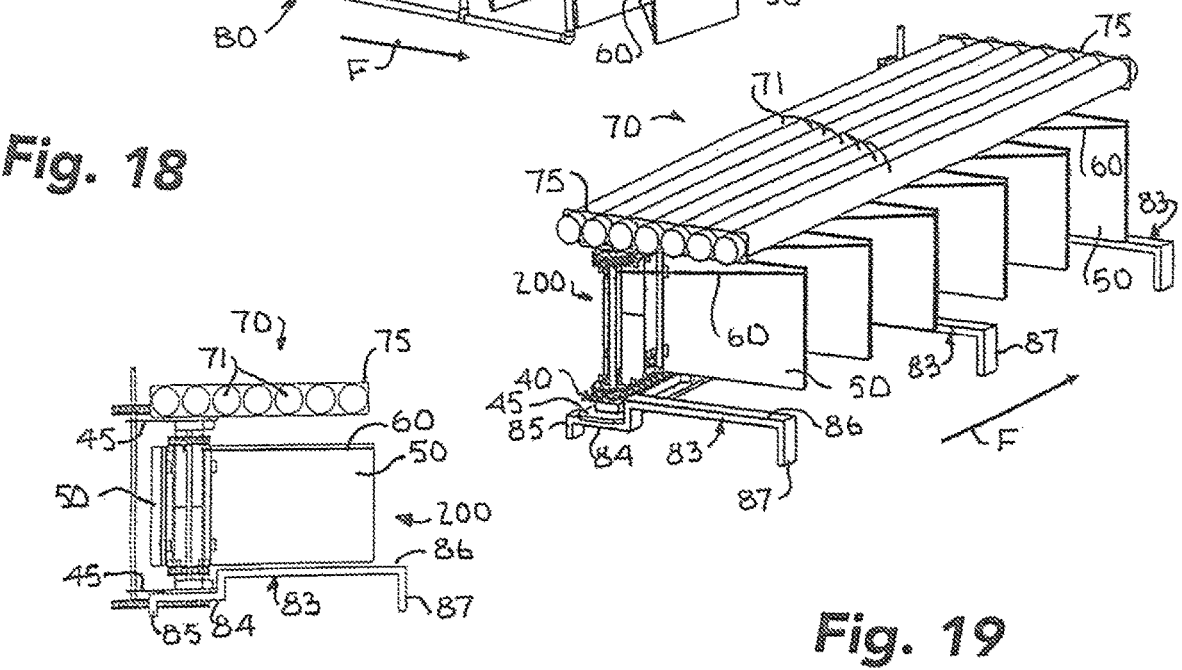
Fig. 19
Fig. 20

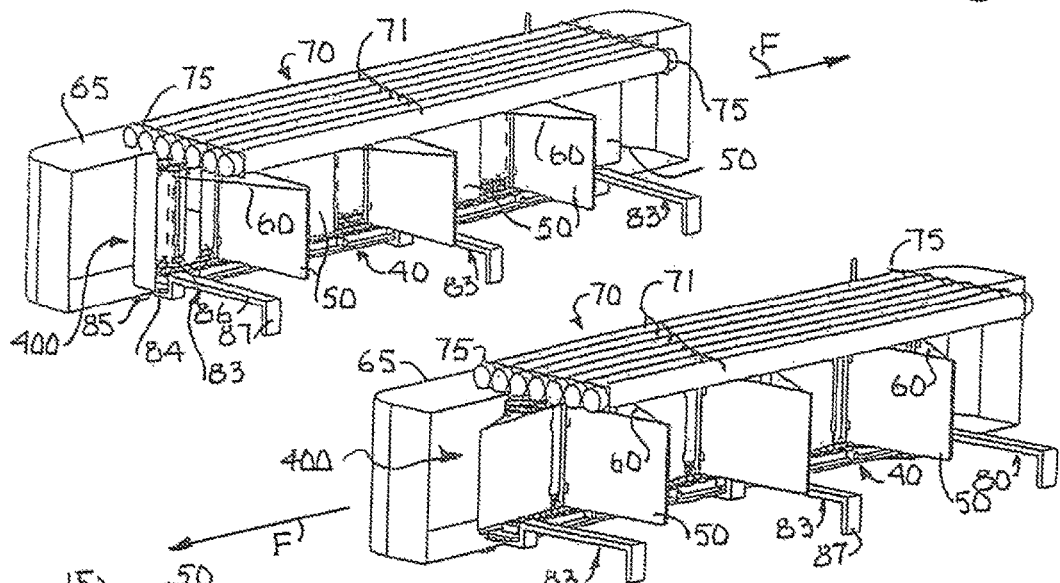
*Fig. 21*
*Fig. 22*
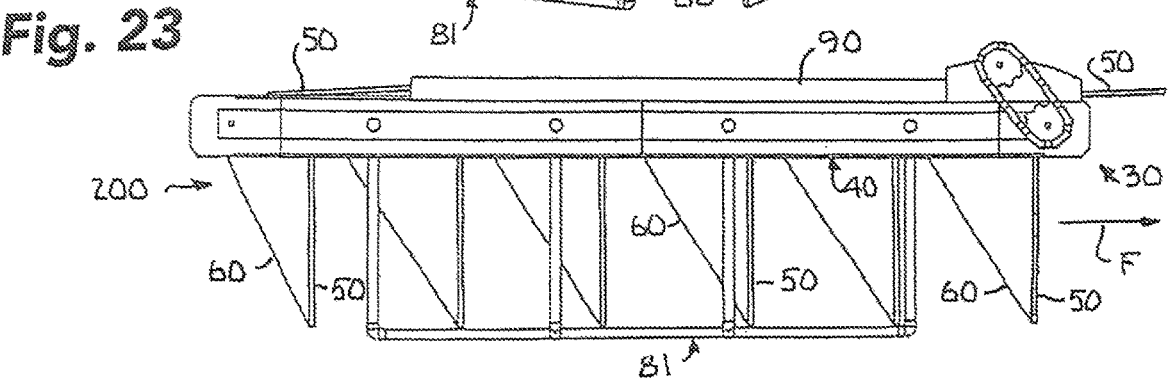
*Fig. 23*
*Fig. 24*

WATER-DRIVEN ELONGATED-CONVEYOR TURBINE AND METHOD OF USING A WATER-DRIVEN ELONGATED-CONVEYOR TURBINE

BACKGROUND OF THE INVENTION

This invention relates generally to converting mechanical energy to electrical energy and more particularly concerns harnessing the power generated by the movement of large masses of water such as ocean tides and the flow of rivers and streams.

The two most common types of hydrokinetic turbine are axial flow turbines and cross-flow turbines. Axial flow turbines are Ferris-wheel-like devices. Peripheral blades rotate about a center axis. Each blade is perpendicular to the driving water flow only at the nadir of the wheel. Cross-flow turbines are propeller-like devices. Radial blades on a center shaft rotate in transverse relationship to the driving water flow.

Low head turbines such as water wheels have extremely low efficiency. Therefore, sections of rivers with little or no head are not economical resources for axial water flow power generation. More traditional turbines such as those of Francis, Pelton and Kaplan require high heads of water to generate the pressure and velocity necessary for operation. Therefore, sections of rivers with little or no head are not at all economical resources for cross water flow power generation.

The majority of tidal turbines currently available are low efficiency and targeted for use in high velocity water. The high velocity requirement limits the locations available for deployment because otherwise desirable tidal areas are often located in sparsely populated regions far from peak electricity demand.

Many tidal turbines have drawbacks beyond the availability of suitable water flow conditions. Large crane vessels are often needed to install the foundations as well as the turbines. Installation in normal conditions can be extremely expensive and unusual weather conditions can greatly increase the installation costs. Once installed, severe damage from rogue weather can pile high maintenance costs on top of the high installation costs.

It is, therefore, an object of this invention to provide a water-driven turbine that can extract energy from water flowing at any speed. Another object of this invention is to provide a water-driven turbine that is efficient in low and high velocity water flow. A further object of this invention is to provide a water-driven turbine that is capable of operation while floating, resting on a water bed or at any depth in between. An additional object of this invention is to provide a water-driven turbine that can be towed from shore to site. It is also an object of this invention to provide a water-driven turbine that can be towed or self-propelled to the site of installation. Yet another object of this invention is to provide a water-driven turbine that mitigates the significance of impact of its components with floating debris. Still another object of this invention is to provide a water-driven turbine that is cavitation free. And it is an object of this invention to provide a water-driven turbine that is fish and mammal friendly.

SUMMARY OF THE INVENTION

A fixed-paddle power-generating turbine in accordance with the invention uses flow of water to drive an endless conveyor along a path including down-streaming and up-streaming straightaways. Paddles are spaced at equal or variable intervals along, fixed to and extend outwardly from the conveyor. The paddles extend downward into the flow of water on the down-streaming straightaway and upward out of the flow of water on the up-stream straightaway. The paddles extending downward are driven downstream by the flow of water. At least significant portions of the paddles extending upward are driven against the atmosphere. Because of the force differential, the paddles on the down-streaming straight away continuously cause the endless conveyor to travel along its path.

Each paddle is independently interchangeable with replacement paddles of different shape, size and/or angle of attack to suit the mode of operation and the characteristics of the flow of water. In a deployment mode the conveyor is responsive to an external drive to cause the turbine to crawl from one location to another. In an operating mode the conveyor is responsive to the flow of water to cause the turbine to generate power.

The fixed-paddle power-generating turbine is primarily intended to operate at the surface of a flow of water and can be moored using a multiple-point system with corresponding independently adjustable mooring lines or a single point swinging mooring line. The turbine may include legs attached to its frame to support the turbine on bottom. The legs may be ballast-filled to stabilize the orientation of the turbine in the water when the legs are not resting on bottom. The fixed-paddle power-generating turbine can include one or more modules mounted on its frame and capable of containing a sufficient quantity of buoyancy or ballast medium to set the level the turbine at a predetermined elevation in the flow of water. The quantity of buoyancy or ballast medium may be variable so as to enable changing the elevation of the turbine in the flow of water. The modules can be manifolded to allow independent variation of the quantity of buoyancy or ballast medium in each module.

A unidirectional hinged-paddle power-generating turbine in accordance with the invention uses flow of water to drive an endless conveyor along a path with down-streaming and up-streaming straightaways. The paddles are spaced at equal or variable intervals along and hinged to the conveyor and are limited to swing within high resistance orientations when on the down-streaming straightaway and within low resistance orientations when on the up-streaming straightaway. Independent tethers connected between corresponding paddles and the conveyor prevent the paddles on the down-streaming straightaway from swinging beyond a maximal high resistance orientation. When in their high resistance orientations the paddles are driven downstream by the flow of water, continuously causing the endless conveyor to travel along its path.

Each paddle is independently interchangeable with replacement paddles of different shape, size and/or angle of attack to suit the mode of operation and the characteristics of the flow of water. In a deployment mode, the conveyor is responsive to an external drive to cause the turbine to crawl from one location to another. In an operational mode, the conveyor is responsive to the flow of water to cause the turbine to generate power.

The unidirectional hinged-paddle power-generating turbine is intended to operate at or below the surface of the flow of water and can be moored using a multiple-point system with corresponding independently adjustable mooring lines or a single point swinging mooring line. The turbine may include legs attached to its frame to support the turbine on bottom. The legs may be ballast-filled to stabilize the orientation of the turbine in the water when the legs are not resting on bottom. The unidirectional hinged-paddle power-generating turbine can include one or more modules mounted on its frame and capable of containing a sufficient quantity of buoyancy or ballast medium to set the level the turbine at a predetermined elevation in the flow of water. The quantity of buoyancy or ballast medium may be variable so as to enable changing the elevation of the turbine in the flow of water. The modules can be manifolded so as to allow independent variation of the quantity of buoyancy or ballast medium in each module.

A bidirectional hinged-paddle power-generating turbine in accordance with the invention uses reversing or tidal flows of water to drive an endless conveyor along a path including oppositely streaming straightaways. Paddles are spaced at equal or variable intervals along and are alternately oppositely hinged to the conveyor. When on the down-streaming straightaway in one direction of the reversing flow of water, the odd paddles swing within high resistance orientations. When on the down-streaming straightaway in the opposite direction of the reversing flow of water, the even paddles swing within high resistance orientations. When on the up-streaming straightaway in either direction of flow of water, all paddles swing within low resistance orientations. Independent tethers connected between corresponding paddles and the conveyor prevent the paddles from swinging beyond a maximal high resistance orientation when on the down-streaming straightaway. When in their high resistance orientations the paddles are driven downstream by the flow of water, continuously causing the endless conveyor to travel along its path.

Each paddle is independently interchangeable with replacement paddles of different shape, size and/or angle of attack to suit the mode of operation and the characteristics of the flow of water. In a deployment mode, the conveyor is responsive to an external drive to cause the turbine to crawl from one location to another. In an operational mode, the conveyor is responsive to the reversing flows of water to continuously cause the turbine to generate power.

The bidirectional hinged-paddle power-generating turbine can operate at or below the surface of the flow of water and can be moored at or below the surface using a multi-point mooring system with corresponding independently adjustable mooring lines, preferably at least one at each end of the turbine, to maintain the conveyor in alignment within the reversing flows of water. The turbine may include legs attached to its frame to support the turbine on bottom.

The legs may also be ballast-filled to stabilize the orientation of the turbine in the water when the legs are not resting on bottom. The bidirectional hinged-paddle power-generating turbine can include one or more modules mounted on its frame and capable of containing a sufficient quantity of buoyancy or ballast medium to set the level of the turbine at a predetermined elevation in the flow of water. The quantity of buoyancy or ballast medium may be variable so as to enable changing the elevation of the turbine in the flow of water. The modules can be manifolded to allow independent variation of the quantity of buoyancy or ballast medium in each module.

The bidirectional hinged-paddle power-generating turbine may be oriented in the flow of water with the conveyor travelling about either horizontal or vertical axes. Preferably the turbine will have a shroud shielding the paddles on the up-streaming straightaway against direct attack by downstream flow of water.

In a fixed-paddle method of energy conversion in accordance with the invention, outwardly extending spaced-apart paddles of shape, size and angle of attack suitable to convert water-flow energy into electrical energy are fixed to an elongated endless conveyor. The conveyor is aligned longitudinally in a flow of water at an elevation at which paddles extending upward from the conveyor are at least partially above and paddles extending downward from the conveyor are below a surface of the flow of water. The conveyor is secured in the aligned orientation and the flow of water is allowed to propel paddles extending downward from the conveyor downstream to turn the conveyor.

Paddles of shape, size and angle of attack suitable to cause the conveyor to crawl from one location to another may be initially fixed to the conveyor and the conveyor driven by an external power source to transport the turbine from one location to another location at which the external source can be disconnected and the crawling paddles replaced, if necessary, by power-generating paddles.

The elevation of the conveyor in the flow of water can be set by injecting a flotation or ballast medium into a level control module attached to a frame of the conveyor and adjusted by varying the quantity of the injected medium.

Prior to aligning the conveyor in the flow of water, a single point swinging mooring line adapted to maintain the conveyor in a direction of tidal flow can be attached to a frame of the conveyor or, alternatively, a multi-point mooring system with corresponding independently adjustable mooring lines can be attached to a frame of the conveyor, for use in positioning the conveyor in the flow of water. In the latter alternative, the mooring lines can also be independently adjusted to transport the conveyor from shore into the flow of water.

In a unidirectional hinged-paddle surface method of energy conversion in accordance with the invention, paddles of shape, size and angle of attack suitable to convert water-flow energy into electrical energy are hinged at intervals to an elongated endless conveyor to swing within high and low resistance orientations. The conveyor is longitudinally aligned in a flow of water at an elevation at which the hinged paddles, when on an up-streaming straightaway of the conveyor, extend at least partly above a surface of the flow of water within the low resistance orientations and, when on a down-streaming straightaway of the conveyor, extend fully into the flow of water within the high resistance orientations. The conveyor is secured in the aligned orientation and the flow of water is allowed to propel paddles on the down-streaming straightaway of the conveyor to turn the endless conveyor.

Paddles of shape, size and angle of attack suitable to cause the conveyor to crawl from one location to another location may be initially fixed to the conveyor and the conveyor driven by an external power source to transport the turbine from one location to the other location at which the external source can be unhinged and the crawling paddles replaced, if necessary, by power-generating paddles.

The elevation of the conveyor in the flow of water can be set by injecting a flotation or ballast medium into a level control module attached to a frame of the conveyor and changed by varying the quantity of the injected medium.

Prior to aligning the conveyor in the flow of water, a single point swinging mooring line adapted to maintain the conveyor in a direction of tidal flow can be attached to a frame of the conveyor or, alternatively, a multi-point mooring system with corresponding independently adjustable mooring lines can be attached to a frame of the conveyor, for use in positioning the conveyor in the flow of water. In the latter alternative, the mooring lines can also be independently adjusted to transport the conveyor from shore into the flow of water.

In a unidirectional hinged-paddle below-surface method of energy conversion in accordance with the invention, paddles of shape, size and angle of attack suitable to convert water-flow energy into electrical energy are hinged at intervals to an elongated endless conveyor to swing within high and low resistance orientations. The conveyor is longitudinally aligned in a flow of water at an elevation at which the hinged paddles are below a surface of the flow of water whether on up-streaming or down-streaming straightaways of the conveyor and swing within high resistance orientations when on the down-streaming straightaway and within low resistance orientations when on the up-streaming straightaway. The conveyor is secured in the aligned orientation and the flow of water is allowed to propel paddles on the down-streaming straightaway of the conveyor to turn the endless conveyor.

Paddles of shape, size and angle of attack suitable to cause the conveyor to crawl from one location to another may be initially fixed to the conveyor and the conveyor driven by an external power source to transport the turbine from one location to another location at which the external source can be unhinged and the crawling paddles replaced, if necessary, by power-generating paddles.

The elevation of the conveyor in the flow of water can be set by injecting a flotation or ballast medium into a level control module attached to a frame of the conveyor and changed by varying the quantity of the injected medium.

Prior to aligning the conveyor in the flow of water, a single point swinging mooring line adapted to maintain the conveyor in a direction of tidal flow can be attached to a frame of the conveyor or, alternatively, a multi-point mooring system with corresponding independently adjustable mooring lines can be attached to a frame of the conveyor, for use in positioning the conveyor in the flow of water. In the latter alternative, the mooring lines can also be independently adjusted to transport the conveyor from shore into the flow of water.

In a bidirectional hinged-paddle surface method of energy conversion in accordance with the invention, paddles of shape, size and angle of attack suitable to convert water-flow energy into electrical energy are hinged at intervals to an elongated endless conveyor. Alternate paddles are limited to swing in opposite directions within high and low resistance orientations, the odd paddles swinging within the high resistance orientations when on the down-streaming straightaway of the conveyor, the even paddles swinging within the high resistance orientations when on the down-streaming straightaway of the conveyor and all the paddles swinging within the low resistance orientations on the up-streaming straightaway of the conveyor. The conveyor is longitudinally aligned in a reversing flow of water at an elevation at which the hinged paddles, when on the up-streaming straightaway of the conveyor, extend at least partly above a surface of the flow of water and, when on the down-streaming straightaway of the conveyor, extend fully into the flow of water. The conveyor is secured in the aligned orientation. Flow in one direction of reversing flow is allowed to propel the odd paddles on the down-streaming straightaway and cause the conveyor to generate power. Flow in the opposite direction of reversing flow is allowed to propel the even paddles on the down-streaming straightaway. Thus, the conveyor continuously generates power.

Prior to aligning the conveyor in the flow of water at least two independently adjustable mooring lines can be attached to a frame of the conveyor. The mooring lines can be independently adjusted to position the conveyor in the reversing flow path and, in narrow channels, to transport the conveyor from shore to the flow of water.

In a bidirectional hinged-paddle below-surface method of energy conversion in accordance with the invention, paddles of shape, size and angle of attack suitable to convert water-flow energy into electrical energy are hinged at intervals to an elongated endless conveyor. Alternate paddles are limited to swing in opposite directions within high and low resistance orientations, the odd paddles swinging within the high resistance orientations when on the down-streaming straightaway of the conveyor, the even paddles swinging within the high resistance orientations when on the down-streaming straightaway of the conveyor and all the paddles swinging within the low resistance orientations on the up-streaming straightaway of the conveyor. The paddles on the up-streaming straightaway are shielded against direct attack by the downstream flow of water. The conveyor is longitudinally aligned in the reversing flow of water at an elevation at which the hinged paddles are fully in the flow of water on the oppositely streaming straightaways. The conveyor is secured in the aligned orientation. Flow in one direction of reversing flow is allowed to propel the odd paddles on the down-streaming straightaway and cause the conveyor to generate power. Flow in the opposite direction of reversing flow is allowed to propel the even paddles on the down-streaming straightaway and cause the conveyor to generate power. Thus, the conveyor continuously generates power.

Prior to aligning the conveyor in the flow of water a multi-point mooring system with corresponding independently adjustable mooring lines can be attached to a frame of the conveyor. The mooring lines can be independently adjusted to position the conveyor in the reversing flow path and, in narrow channels, to transport the conveyor from shore to the flow of water.

BRIEF DESCRIPTION OF THE DRAWINGS

Other objects and advantages of the invention will become apparent upon reading the following detailed description and upon reference to the drawings in which:

FIG. 4 is a front right top perspective view of a fixed-paddle water-driven turbine in accordance with the invention;

FIG. 5 is a front elevation view of the fixed-paddle water-driven turbine of FIG. 4;

FIG. 6 is a diagrammatic illustration of the orientation of a single fixed paddle during a single conveyor rotation of the fixed-paddle water-driven turbine of FIG. 4;

FIG. 10 is a right end elevation view of the unidirectional hinged-paddle water-driven turbine of FIG. 7;

FIG. 11 is a diagrammatic illustration of the orientation of a single hinged paddle during a single conveyor rotation of the unidirectional hinged-paddle water-driven turbine of FIG. 7;

FIG. 12 is a front right top perspective view of another unidirectional hinged-paddle water-driven turbine in accordance with the invention;

FIG. 17 is a front right top perspective view of the unidirectional hinged-paddle water-driven turbine of FIG. 7 with a single level control module attached;

FIG. 18 is a front right top perspective view of the unidirectional hinged paddle water-driven turbine of FIG. 7 with multiple adjustable level control modules attached;

FIG. 19 is a front left top perspective view of the unidirectional hinged-paddle water-driven turbine of FIG. 7 with drive shafts aligned on vertical axes and with adjustable level control modules attached;

FIG. 20 is a left side elevation a view of the unidirectional hinged-paddle water-driven turbine of FIG. 19;

FIG. 21 is a front left top perspective view of a bidirectional hinged-paddle water-driven turbine in accordance with the invention with drive shafts aligned on vertical axes, with multiple adjustable level control modules attached and with a housing containing the paddles on its up-streaming straightaway operating in a tidal flow directed downstream toward its driven shaft;

FIG. 22 is front left top perspective view of the bidirectional hinged-paddle water-driven turbine of FIG. 21 operating in a reversed tidal flow directed downstream from its driven shaft;

FIG. 23 is a front right top perspective view of the hinged-paddle water-driven turbine of FIG. 7 with a cover added;

FIG. 24 is a side elevation view of the hinged-paddle water-driven turbine of FIG. 23;

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

Common Components of the Various Embodiments of the Turbine

Figure 1:
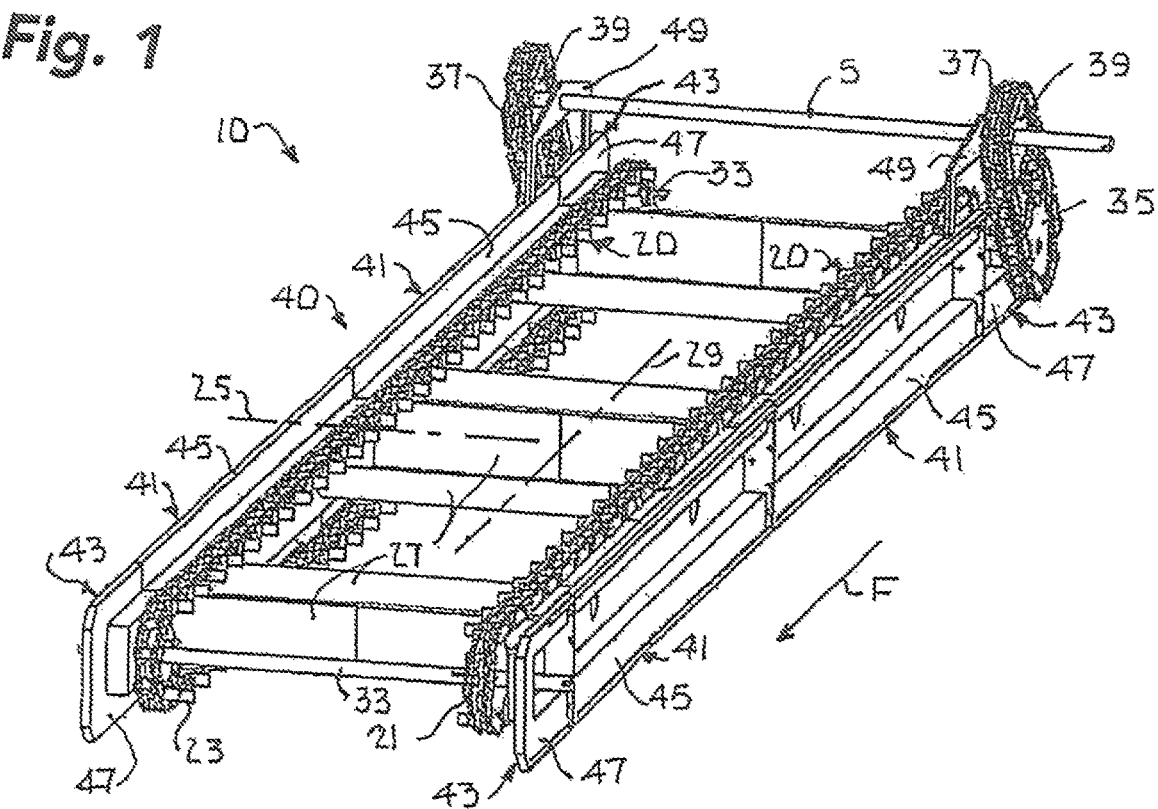
FIG. 1 is a rear left top perspective view of a preferred conveyor and power take-off assembly of a water-driven turbine in accordance with the invention.
Figure 2:
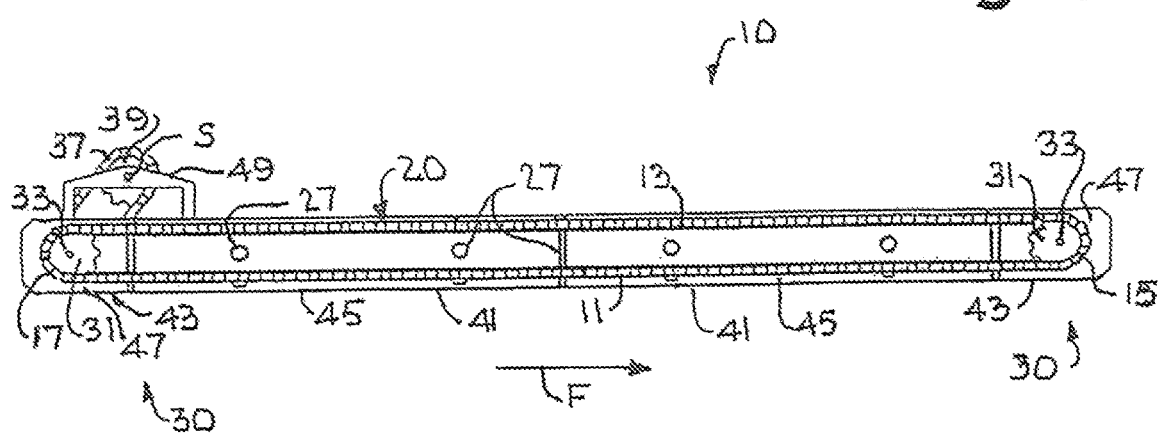
FIG. 2 is a right elevation view of the left side of the preferred conveyor and power take-off assembly of FIG. 1.

Turning first to FIGS. 1 and 2, various embodiments of a water-driven turbine in accordance with the invention have in common an elongated endless conveyor 10 including a down-streaming straightaway 11 and an up-streaming straightaway 13 connected at their ends by downstream and upstream travel-reversing turns 15 and 17. As used herein, "downstream" and "upstream" and "down-streaming" and "up streaming" are in reference to the direction of flow of water F. As shown in FIGS. 1 and 2, the preferred conveyor 10 consists of two lengthwise chains 20 and two widthwise, preferably identical, sprocket assemblies 30 forming a generally orthogonal conveyor 10.

Each conveyor chain 20 consists of a series of links 21 in which paddle-attachment links 23 are correspondingly interspersed. Each sprocket assembly 30 has two sprockets 31, one mounted on each end of a widthwise shaft 33, for rotation in unison. Each lengthwise conveyor chain 20 is engaged on corresponding sprockets 31 of the two sprocket assemblies 30. The shafts 33 and sprockets 31 rotate and the chains 20 travel in unison in either a clockwise or a counterclockwise direction. In a deployment mode, an external source of energy (not shown) drives the conveyor 10. In a power-generating mode, the flow of water F drives the conveyor 10.

Continuing to look at FIGS. 1 and 2, a preferred support frame 40 for the chains 20 and the sprocket assemblies 30 has at least one elongated interior module 41 capped by two identical end modules 43. The end modules 43 are adapted to support the above-described sprocket assemblies 30. The ability to serially connect multiple identical interior modules 41 between the end modules 43 facilitates efficiency in turbine assembly and also enables assembly of more efficient turbines. The interior modules 41 shown have lengthwise side panels 45 spaced apart by widthwise crossmembers 27. The end modules 43 shown have lengthwise side panels 47 spaced apart by connection to the ends of their corresponding interior module side panels 45 and by the structure of their corresponding widthwise sprocket assemblies 30. Preferably, and as shown, the sprockets 31 of both sprocket assemblies 30 will be of equal diameter so that the chains 20 will have parallel down-streaming and up-streaming straightaways 11 and 13.

In an operable scaled-down test prototype, and as shown in FIGS. 1 and 2, a frame 40 with two interior modules 41 each two meters long were capped by end frame modules 43 each one half meter long. The side panels 45 and 47 of the interior and end modules 41 and 43 were fabricated from painted steel sections. The end modules 43 were equipped with conveyor tensioners (not shown). Every third link of each conveyor chain 20 was a paddle-attachment link 23, facilitating a wide range of paddle setups.

Interchangeable Paddles

Still looking at FIGS. 1 and 2, and as explained above, each conveyor chain consists of a series of links 21 interspersed with paddle-attachment links 23. The paddle-attachment links 23 are aligned on widthwise axes 25 of the conveyor 10. The efficiency of the turbine will, at least in part, be dependent upon the spacing of the paddles attached to the paddle-attachment links 23. The spaces between the paddle-attachment links 23 can be equal or variable in length and can be asymmetric. However, is not required that every paddle-attachment link 23 be used for attachment of a paddle and the distances between used paddle-attachment links 23 may be constant, symmetrically sequenced or random, so the spacing of paddles is easily varied. The more frequent the paddle-attachment links 23 in the conveyor chains 20, the greater the flexibility in paddle arrangement.

The efficiency of a turbine in its deployment and power-generating modes is, at least in part, dependent upon the number, size and shape of the paddles 50 and on the angles of idle 55 and attack 57 of the paddles attached to the paddle-attachment links 23. As used herein, "elongated" characterizes the "straightaways" as being straight for a distance supporting more than one paddle at the same time. In the deployment mode, smaller paddles are better suited to facilitate the turbine crawling from one location to another, whether on or off shore. When a turbine reaches a buoyancy depth in the water, the smaller paddles can be replaced by larger paddles to provide more rapid deployment travel. Once deployment has been completed, the paddles can again be changed to maximize the power-generating performance of the turbine. The conveyor 10 shown permits paddle changes to be made ashore or in the water.

Figure 3A:
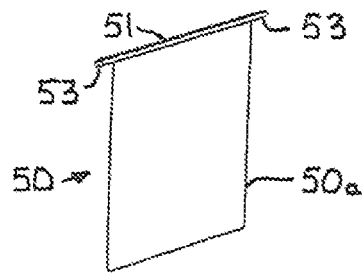
FIGS. 3A-3G are front right top perspective views of exemplary interchangeable paddles usable with water driven turbines in accordance with the invention.
Figure 3B:
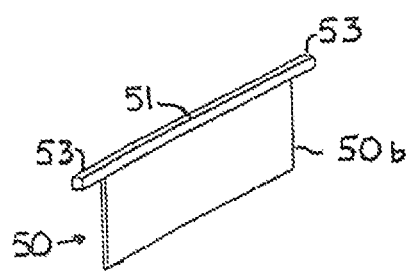
Figure 3C:
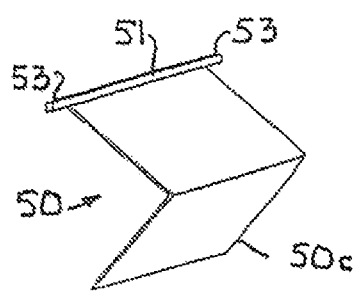
Figure 3D:
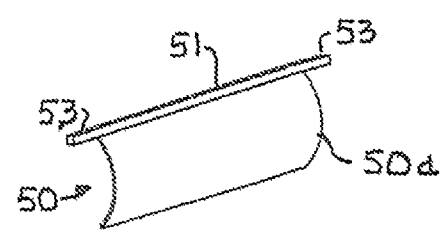
Figure 3E:
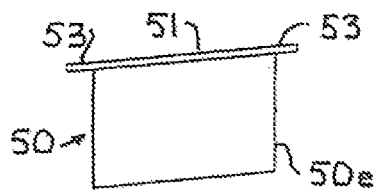
Figure 3F:
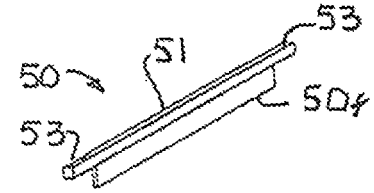
Figure 3G:
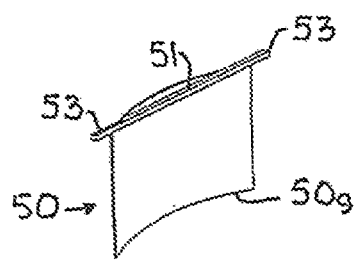

Turning to FIGS. 3A-3G, the different paddles 50 shown are exemplary of a wide range of paddle options. Long flat rectangular paddles 50a, such as seen in FIG. 3A, are preferred in deeper waters, typically greater than five meters and most likely in ocean currents because of the water depth and because larger paddles will not be impacted by the surroundings. Short flat rectangular paddles 50b, such as seen in FIG. 3B, are preferred in shallow waters, typically less than five meters and most likely in rivers and similar waterways with shallow depths in which drag on the bed of the river or waterway might slow the rotation of the turbine conveyor 10. Angled paddles 50c, such as seen in FIG. 3C, reduce the drag applied during transition from the down-streaming straight away 11 to the up-streaming straight away 13. Arced paddles 50d, such as seen in FIG. 3D, can have a vertical-plane curvature accommodating waterflow speed in order to maximize turbulence at the edges of the paddle. Intermediate length paddles 50e, such as seen in FIG. 3E, may be preferred when the turbine is mounted in a channel or is bidirectional. Very short paddles 50f, such as seen in FIG. 3F, may be preferred when a turbine is operating in a crawling or self-deploying mode on shore or in very shallow water. Arced paddles 50g, such as seen in FIG. 3G, can have a horizontal-plane curvature useful in low speed water flow conditions, acting as a bucket to harness greater volumes of water to generate power and to allow water on the backside of the paddle to be deflected around the edge of the paddle so that each paddle is not pushing water. Whether paddles are "suitable" for use in relation to turbine-crawling paddles and power-generating paddles can be empirically determined.

Continuing to look at FIGS. 3A-3G, the exemplary paddles 50a-g, generically identified as paddles 50, can be made of a rigid material, perhaps plastic or metal. Each of the paddles 50 is reinforced by a widthwise bar 51. The ends 53 of the bar 51 are configured to be mounted on their corresponding paddle-attachment links 23 to secure the paddle 50 between the conveyor chains 20. The paddle-attachment links 23 cooperate with the bar 51 to facilitate the interchanging of paddles 50 and to lock the paddle 50 to the conveyor chains 20 at a selected idle angle 55 relative to the conveyor 10.

Drive Chain Options

Returning to FIGS. 1 and 2, the downstream flow of water F in which the turbine is deployed may be toward either one of the sprocket assemblies 30. As shown, the upstream sprocket assembly 30 has been arbitrarily selected to serve as the main drive sprocket assembly. As also shown, the direction of downstream water flow F has been arbitrarily chosen to flow from the main drive sprocket assembly 30 toward the secondary sprocket assembly 30.

The sprocket assembly 30 serving as the main sprocket assembly is modified by the addition of at least one and as shown two main drive sprockets 35. The main drive sprockets 35 are mounted for rotation in unison with their respective sprocket assembly shaft 33 and are coupled by corresponding main drive chains 37 to corresponding power take-off (PTO) sprockets 39 mounted on and for rotation with a PTO shaft S. The PTO shaft S is journaled on brackets 49 added to the support frame 40 and has an extended length to facilitate connection to a wide variety of energy-harnessing systems.

Fixed-Paddle Turbines

Turning now to FIGS. 4-5, in the fixed-paddle turbine 100 shown, eleven paddles 50 are spaced apart along the conveyor 10 and fixed to the conveyor chains 20. The paddles 50 are said to be fixed to the conveyor chains 20 because each paddle-attachment link 23 locks its paddle 50 in a constant angular relationship to its paddle-attachment link 23. Therefore, the paddles 50 always extend outward from the conveyor 10 at an idle angle 55 with respect to the up-streaming straightaway 13 and at an attack angle 57 with respect to the down-streaming straightaway 13. Preferably, and as shown, the angles 55 and 57 are equal and the paddles 50 are in planes perpendicular to the lengthwise axes 29 of the conveyor 10 when on the straightaways 13 and 15 and to their paddle-attachment links 23 when on the turns 17 and 19.

The fixed-paddle turbine 100 is intended to be operated with the up-streaming straightaway 13 of the conveyor 10 generally parallel to the surface of the flow of water F. It is well suited for use in a river or other unidirectional waterway, as shown in a flow of water F from the main drive sprocket assembly 30 toward the secondary sprocket assembly 30, but water flow from the secondary sprocket assembly 30 toward the main drive sprocket assembly 30 would serve as well.

The fixed-paddle turbine 100 is also capable of bidirectional operation. For example, in a power-generating mode in a tidal application, if flow of water F in one direction results in clockwise travel of the conveyor 10, tide reversal will result in counterclockwise travel of the conveyor 10. In either direction of tidal flow the PTO shaft S will still transfer energy from the turbine 100 to the power harnessing device (not shown).

FIG. 6 illustrates a single conveyor cycle C for a single fixed paddle 50 during its power-generating mode of operation. While the paddle-attachment link 23 is on the down-streaming straightaway 11, its paddle 50 extends downward into the flow of water F. As the paddle-attachment link 23 transitions through the downstream turn 15, the paddle 50 remains perpendicular to its paddle-attachment link 23, generally radially outwardly from the conveyor 10. While the paddle-attachment link 23 is on the up-streaming straightaway 13, its paddle 50 extends upward into the atmosphere. As the paddle-attachment link 23 transitions through the upstream turn 17, the paddle 50 remains perpendicular to its paddle-attachment link 23, generally radially outwardly from the conveyor 10. This completes one cycle C for one paddle 50 of the fixed-paddle turbine 100.

The paddles 50 are entirely in the flow of water F when on the down-streaming straightaway 11 and at least partially and preferably entirely above the surface on the up-streaming straightaway 13. Therefore, the flow of water F drives the downward extending paddles 50 downstream and the at least partially above surface paddles 50 travel upstream against a lesser force. The force differential continuously causes the paddles 50 on the down-streaming straightaway 11 to propel the conveyor chains 20 to travel along the endless conveyor path, driving the sprockets 31 and the shaft 33 of the main sprocket assembly 30 and also the drive sprocket 35 added to the shaft 33. The single PTO sprocket 39 and the PTO shaft S are journaled on a single bracket 49 added to the support frame 40. The drive chain 37 links the drive sprocket 35 and the PTO sprocket 39 and the PTO shaft S transfers energy from the fixed-paddle turbine 100 to a power harnessing device (not shown).

Unidirectional Hinged-Paddle Turbines

Turning now to FIGS. 7-11, in the unidirectional hinged-paddle turbine 200 shown, the frame 40 supports a conveyor 10 with twelve paddles 50 spaced apart along and hinged to its chains 20. The main drive sprocket assembly 30 of the hinged-paddle turbine 200 is, as shown, the downstream assembly 30. Unlike the fixed-paddle turbine 100, the hinged-paddle turbine 200 has two main drive sprockets 35 mounted on opposite respective ends of, and for rotation in unison with, their shaft 33 and each main drive sprocket 35 is coupled by a corresponding main drive chain 37 to respective PTO sprockets 39 mounted on opposite ends of a common PTO shaft S.

Figure 7:
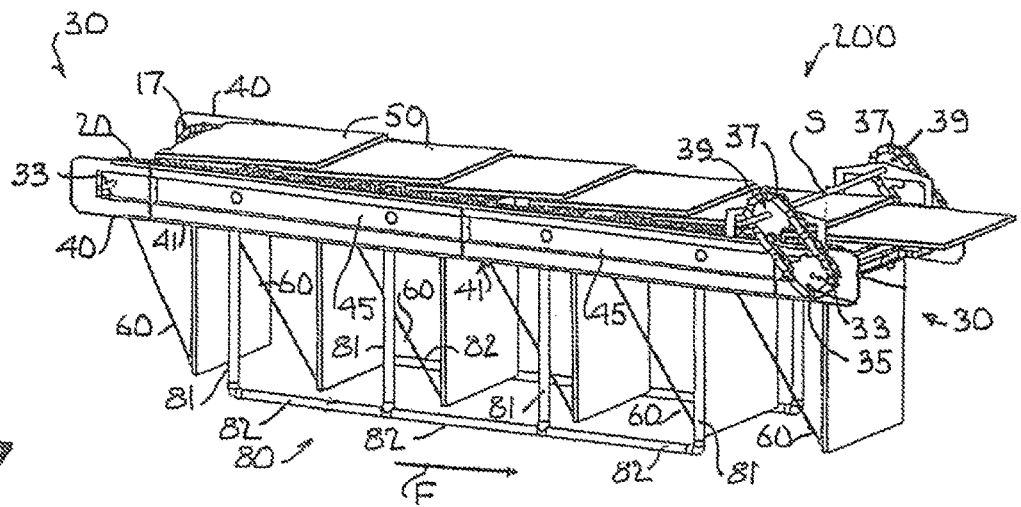
FIG. 7 is a front right top perspective view of a unidirectional hinged-paddle water-driven turbine in accordance with the invention.
Figure 8:
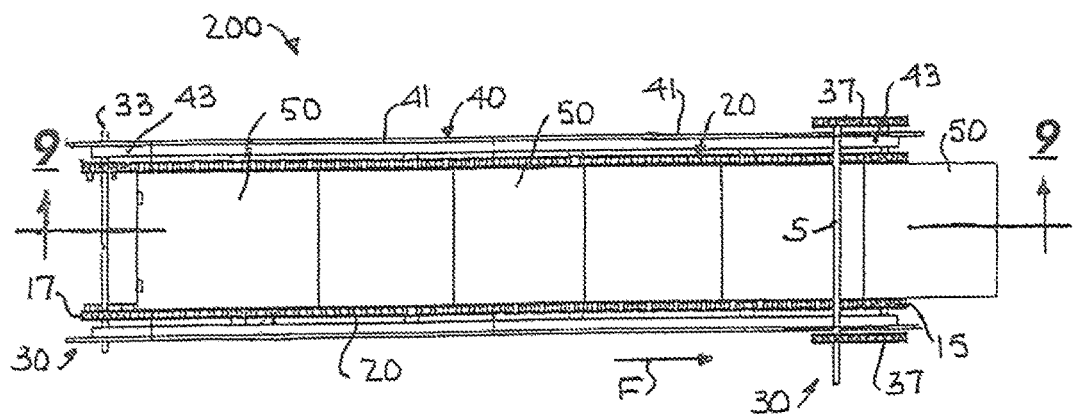
FIG. 8 is a top plan view of the unidirectional hinged-paddle water-driven turbine of FIG. 7.
Figure 9:
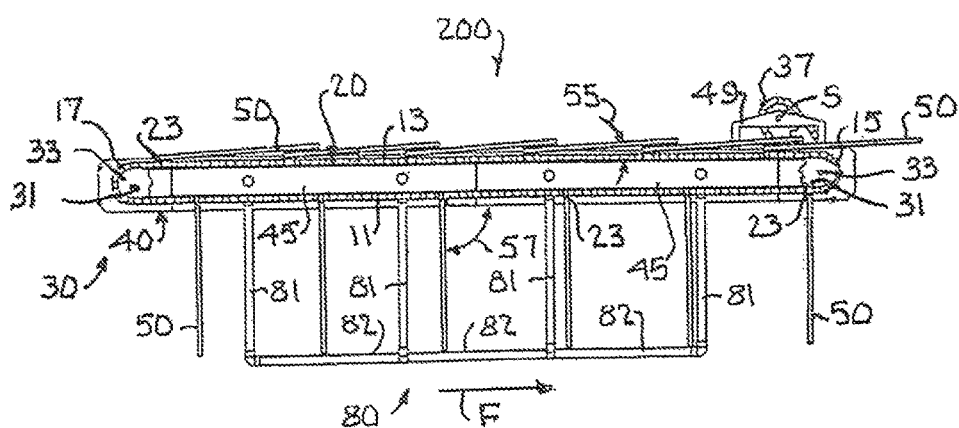
FIG. 9 is a cross-sectional view taken along the line 9-9 of FIG. 8.

Looking at FIGS. 7 and 9, on the down-streaming straightaway 11 the hinged paddles 50 swing within variable high resistance orientations. High resistance orientations are those angular orientations of a paddle 50 from the down-streaming straightaway 11 in which the paddle 50 tends to swing in the direction of flow F toward a maximal high resistance orientation. As seen in FIG. 9, paddles 50 on the down-streaming straightaway 11 have swung away from the down-streaming straightaway 11 into a maximal high resistance high resistance orientation in the flow of water F. The maximal high resistance orientation of each paddle 50 is determined by a flexible tether 60 attached at one end to a free corner of the paddle 50 and at the other end to the conveyor 10, preferably to an otherwise unused paddle attachment link 23 of the conveyor. As best seen in FIGS. 7 and 9, the tethers 60 limit the down-streaming swing of their respective paddles 50 to a predetermined maximal high resistance orientation which, as shown, is at a 90' attack angle 57. The lengths of the tethers 60 or the location of their connection points to the chains 20 can be adjusted to change the attack angle 57.

Continuing to look at FIGS. 7 and 9, on the up-streaming straightaway 13 the hinged paddles 50 swing within variable low resistance orientations. Low resistance orientations are those angular orientations of a paddle 50 from the up-streaming straightaway in which the paddle 50 tends to swing against the direction of flow F toward a minimal low resistance orientation. The minimal low resistance orientation of each paddle 50 is determined by its respective conveyor chain attachment link 23. However, as can be understood from FIGS. 7 and 9, an attachment link 23 could limit the up-streaming swing of its respective paddles 50 to an angle at which the paddle 50 makes contact with its trailing paddle 50, or to a lesser or greater angle. If, as shown, swing is limited to the contact or to a lesser angle, the swing of the paddle 50 will be ended when contact is made between adjacent paddles 50. If at a greater angle, the swing of the paddle 50 will be ended at the idle angle 55, before contact is made by adjacent paddles 50.

FIG. 11 illustrates a single conveyor cycle C for one hinged paddle 50 during its power-generating mode of operation. Looking at FIG. 11 in view of FIGS. 7-10, while the paddle-attachment link 23 is on the down-streaming straightaway 11, its paddle 50 is maintained by its tether 60 in the maximal high resistance orientation in the flow of water F. As the paddle-attachment link 23 transitions through the downstream turn 15, the flexible tether 60 is for half the turn 15 relaxed as the distance between the link 23 and the tether connection point 61 decreases. Therefore, the flow of water F is allowed to cause the paddle 50 to swing toward conformance to the direction of the flow of water F. As the paddle-attachment link 23 transitions the next half of the turn 15 toward the up-streaming straightaway 13, the flexible tethers 60 tightens as the distance between the link 23 and the tether connection point 61 increases. When the paddle-attachment link 23 is on the upstreaming straightaway 13, the paddles 50 are pulled onto the up-streaming straightaway 13 and the link 23 maintains the paddle 50 at the idle angle 55. As best seen in FIGS. 7-10, the previous paddle 50 is also maintained in its minimal resistance orientation at the idle angle 55 predetermined by its conveyor chain attachment link 23. If, as shown, the paddles 50 are longer than their spacing on the chains 20, the hinged end of the transitioning paddle 50 will lie under the free end of the previous paddle 50. As the paddle-attachment link 23 travels the up-streaming straightaway, the paddle 50 remains in the minimal resistance orientation. When the paddle-attachment link 23 transitions onto the up-stream turn 17, the paddle 50 is maintained in the minimal resistance orientation and turns with the link 23 until its free end passes over its center of gravity. The paddle 50 then swings toward, and the water flow will cause the paddle 50 swing fully to, the maximal resistance orientation. The tether 60 limits the swing of the paddle 50 to the maximal resistance orientation. This completes one cycle C for one paddle 50 of the fixed-paddle turbine 200.

The hinged-paddle turbine 200 can be operated at any depth in the water because hinged paddles 50 travelling on the down-streaming straightaway 11 will be in the high resistance orientation and hinged paddles 50 on the up-streaming straightaway 13 will be in the low resistance orientation whether partly or entirely in or out of the water.

As shown in FIGS. 7-11, and hereinafter in FIGS. 17, 18 and 23-30, the conveyor of a unidirectional hinged-paddle turbine is in a generally horizontal orientation but, as hereinafter seen in FIGS. 19-22, the conveyor of a unidirectional hinged-paddle turbine may be in a generally vertical orientation.

In the power-generating mode of operation, when paddles 50 are on the down-streaming straightaway 11 they swing the in the high resistance orientations to the maximum high resistance orientation. When paddles 50 are on the up-streaming straightaway 13 they swing in the low resistance.

Therefore, the flow of water F drives the paddles 50 on the down-streaming straightaway 11 and the force differential continuously propels the conveyor chains 20 to travel along the endless conveyor path, driving the sprockets 31 and the shaft 33 of the main sprocket assembly 30 and also the drive sprocket 35 added to the shaft 33. The single PTO sprocket 39 and the PTO shaft S are journaled on a single bracket 49 added to the support frame 40. The drive chain 37 links the drive sprocket 35 and the PTO sprocket 39 and the PTO shaft S transfers energy from the turbine to a power harnessing device (not shown).

Turning now to FIG. 12, another unidirectional hinged-paddle turbine 300 according to the invention is consistent with the above description of the unidirectional hinged-paddle turbine 200 of FIGS. 7-11 except that the FIG. 12 turbine 300 has only six paddles 50 and the spacing between the paddles 50 is greater than the length of the paddles 50. As a result, the paddles 50 do not overlap while on the up-streaming straightaway 13. And, since the orientation of the paddles 50 on the up-streaming straightaway 13 is determined by their paddle-attachment links 23 to be at the acute predetermined idle angle 55, the spacing of the hinges 23 does not impact the operation. However, as will be seen hereinafter, if the spacing of the hinges 23 is less than the length of the paddles 50, the orientation of the paddles 50 on the up-streaming straightaway 13 will be determined by contact of each paddle 50 with its leading adjacent paddle or the predetermined idle angle 55, whichever first occurs.

Like the unidirectional hinged-paddle turbine 200 in which the paddles 50 on the up-streaming straightaway 13 overlap, the unidirectional hinged-paddle turbine 300 in which the paddles 50 do not overlap can be operated at any depth in the water. The hinged paddles 50 travelling on the down-streaming straightaway 11 will be in the high resistance orientations and the hinged paddles 50 on the up-streaming straightaway 13, whether partly or entirely in or out of the water, will be in the low resistance orientations. And the hinged-paddle turbine 300 can be operated with its conveyor in a generally horizontal orientation or in a generally vertical orientation.

Bidirectional Hinged-Paddle Turbines

Hinged-paddle turbines can be configured to operate in reversing flows of water F, such as tidal flows, without reversing the alignment of the turbine. For example, looking at FIGS. 13-16, a bidirectional hinged-paddle turbine 400 has twelve paddles $50_{1-12}$ alternately hinged so that six odd paddles $50_{1-11}$ swing in one direction and six even paddles $50_{2-12}$ swing in the opposite direction.

Figure 13:
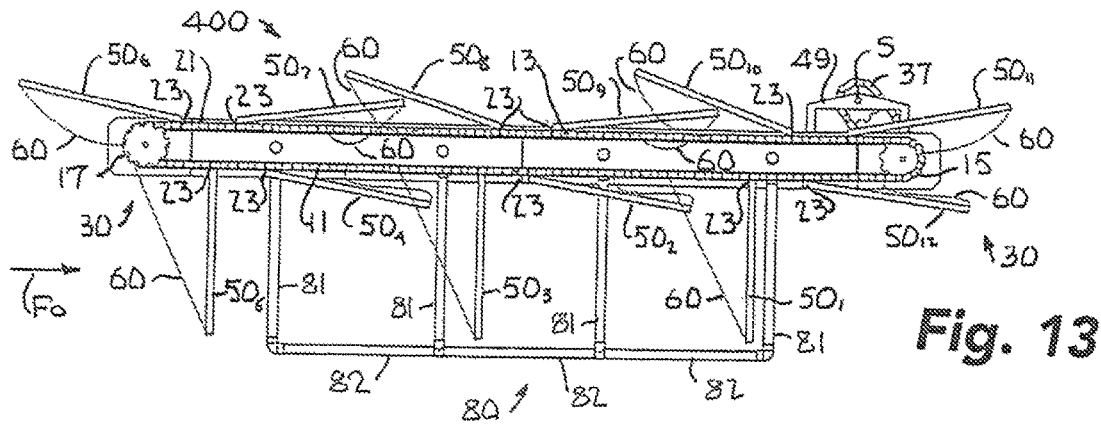
FIG. 13 is a front elevation view with the front frame wall removed of a bidirectional hinged-paddle water-driven turbine in accordance with the invention operating in a tidal flow directed downstream toward its main drive sprocket assembly.

In FIG. 13 tidal flow $F_O$ is directed toward the main drive sprocket assembly 30. The six odd paddles $50_{1-11}$ are hinged so that they will swing downstream in high resistance orientations toward the main drive sprocket assembly 30 when they are on the down-streaming straightaway 11. Their downstream swing is limited by their respective tethers 60 to their maximal resistance orientation. Their upstream swing is in low resistance orientations limited by their respective attachment links 23 to their minimal resistance orientation unless they first contact their immediately leading even paddle $50_{2-12}$.

At the point of conveyor travel seen in FIG. 13, three odd paddles $50_{1-5}$ are in the maximal resistance orientation on the down-streaming straightaway 11. The other three odd paddles $50_{7-11}$ are in the minimal resistance orientation on the up-streaming straightaway 13. At the same time, three even paddles $50_{12-4}$ are conforming in the flow of water $F_O$ toward the minimal resistance orientation on the down-streaming straightaway 11. The other three even paddles $50_{6-10}$ are falling toward the minimal resistance orientation on the up-streaming straightaway 13 but have contacted their immediately leading odd paddles $50_{7-9}$, limiting their swing before reaching the minimal resistance orientation.

Figure 15:
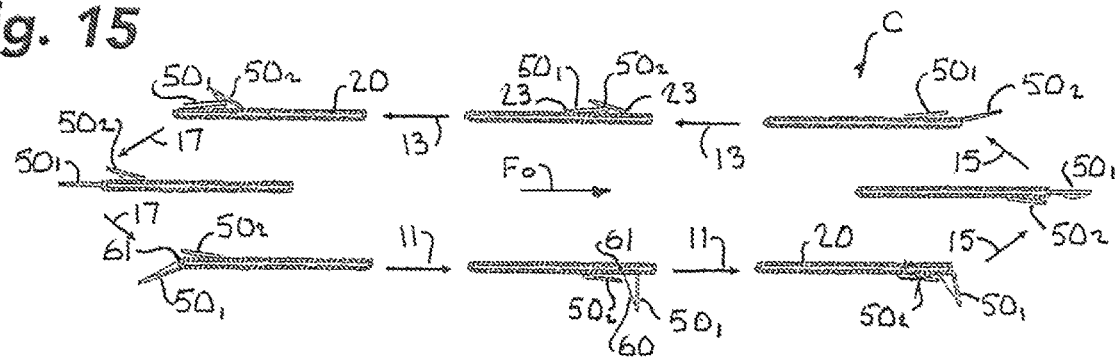
FIG. 15 is a diagrammatic illustration of the orientation of two adjacent hinged paddles during a single conveyor rotation in one direction of the bidirectional turbine of FIG. 14.

Looking at FIGS. 13 and 15, while both the attachment link 23 of the odd paddle $50_1$ and the connection point 61 of its respective flexible tether 60 are on the down-streaming straightaway 11, the odd paddle $50_1$ is limited by its tether 23 to the maximal high resistance orientation in the flow of water $F_O$. At the same time, the flexible tether 61 of the trailing adjacent even paddle $50_2$ is relaxed, allowing the trailing adjacent even paddle $50_2$ to swing toward conformance with the direction of the flow of water $F_O$.

Continuing to look at FIGS. 13 and 15, the cooperation of the attachment links 23, tethers 60 and points of connection 61 of the tethers 60 to the conveyor chain 20 at the turns 15 and 17 will be understood. The attachment link 23 of the rigid odd paddle $50_1$ leads the connection point 61 of its respective flexible tether 60 on the path of the conveyor chain 20. The attachment link 23 of the rigid even paddle $50_2$ trails the connection point 61 of its respective flexible tether 60 on the path of the conveyor chain 20.

For the odd paddles, the tethers 60 relax as the tether connection points 61 move closer to their links 23, as when the link 23 of the odd paddle $50_1$ enters the downstream turn 15 of the conveyor 10. As the link 23 pulls the odd paddle $50_1$ onto the up-streaming straightaway 13, the odd paddle $50_1$ will be supported by its link 23 in its minimal resistance orientation and remains in this condition until it begins to transition around the upstream turn 17. At the upstream turn 17, as the link 23 of the odd paddle $50_1$ leads the connection point 61 of its tether 60 into the turn 17, the tether 60 is still relaxed and the link 23 pulls the odd paddle $50_1$ until it passes beyond vertical and swings toward the flow of water $F_O$. The flow of water $F_O$ then causes the odd paddle $50_1$ to swing toward conformance with the direction of the flow. As the link 23 moves onto the down-streaming straightaway 11, the distance between the link 23 and the connection point 61 of the tether 60 increases. When both the link 23 and the connection point 61 are on the down-streaming straightaway 11, the flow of water $F_O$ will have brought the odd paddle $50_1$ into its maximal resistance orientation.

For flow of water $F_O$ in the direction seen in FIG. 13, the tethers 60 of the even paddles $50_{2-12}$ are always relaxed. When on the down-swinging straightaway 11, the flow of water $F_O$ causes them to swing toward conformance with the direction of flow. When on the up-stream straightaway 13, they are at the idle angle 55 set by their links 23. This completes one cycle C for two paddles $50_1$ and $50_2$ of the fixed-paddle turbine 400 with flow of water in one direction $F_O$.

Figure 14:
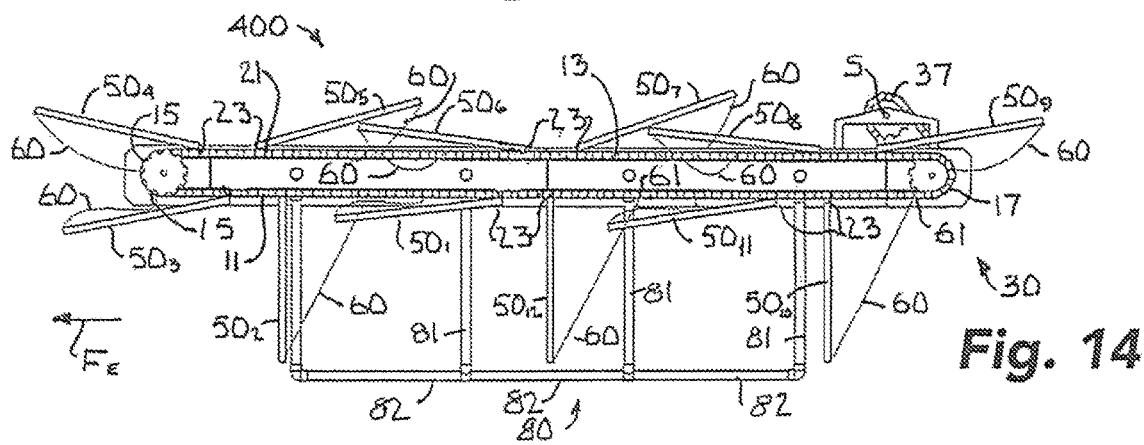
FIG. 14 is a front elevation view with the front frame wall removed of the bidirectional water-driven turbine of FIG. 13 operating in a reversed tidal flow directed downstream away from its main drive sprocket assembly.

In FIG. 14 tidal flow $F_E$ is directed away from the main drive sprocket assembly 30. The six even paddles $50_{2-12}$ are hinged so that they will swing downstream in high resistance orientations toward the main drive sprocket assembly 30 when they are on the down-streaming straightaway 11. Their downstream swing is limited by their respective tethers 60 to their maximal resistance orientation. Their upstream swing is in low resistance orientations limited by their respective attachment links 23 to their minimal resistance orientation unless they first contact their immediately leading odd paddle $50_{1-11}$.

At the point of conveyor travel seen in FIG. 14, three even paddles $50_{10-2}$ are in the maximal resistance orientation on the down-streaming straightaway 11. The other three even paddles $50_{4-8}$ are in the minimal resistance orientation on the up-streaming straightaway 13. At the same time, three odd paddles $50_{11-3}$ are conforming in the flow of water $F_O$ toward the minimal resistance orientation on the down-streaming straightaway 11. The other three odd paddles $50_{5-9}$ are falling toward the minimal resistance orientation on the up-streaming straightaway 13 but two of them $50_{5-7}$ have contacted their immediately leading even paddles $50_{6-8}$, limiting their swing before reaching the minimal resistance orientation.

Figure 16:
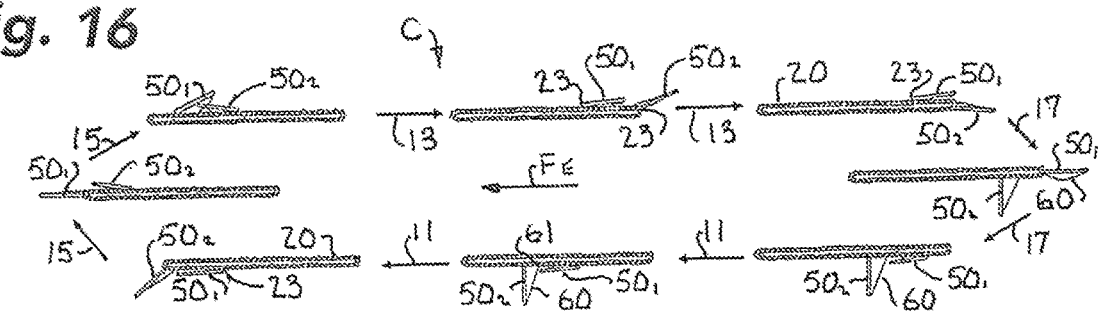
FIG. 16 is a diagrammatic illustration of the orientation of two adjacent hinged paddles during a single conveyor rotation in a reversed direction of the bidirectional turbine of FIG. 14.

Looking at FIGS. 14 and 16, while both the attachment link 23 of the even paddle $50_2$ and the connection point 61 of its respective flexible tether 60 are on the down-streaming straightaway 11, the even paddle $50_2$ is limited by its tether 23 to the maximal high resistance orientation in the flow of water $F_E$. At the same time, the flexible tether 61 of the trailing adjacent odd paddle $50_1$ is relaxed, allowing the trailing adjacent odd paddle $50_1$ to swing toward conformance with the direction of the flow of water $F_E$.

Continuing to look at FIGS. 14 and 16, the cooperation of the attachment links 23, tethers 60 and points of connection 61 of the tethers 60 to the conveyor chain 20 at the turns 15 and 17 will be understood. The attachment link 23 of the rigid even paddle $50_2$ leads the connection point 61 of its respective flexible tether 60 on the path of the conveyor chain 20. The attachment link 23 of the rigid odd paddle $50_1$ trails the connection point 61 of its respective flexible tether 60 on the path of the conveyor chain 20.

For the even paddles, the tethers 60 relax as the tether connection points 61 move closer to their links 23, as when the link 23 of the even paddle $50_2$ enters the downstream turn 15 of the conveyor 10. As the link 23 pulls the even paddle $50_2$ onto the up-streaming straightaway 13, the even paddle $50_2$ will be supported by its link 23 in its minimal resistance orientation and remains in this condition until it begins to transition around the upstream turn 17. At the upstream turn 17, as the link 23 of the even paddle $50_2$ leads the connection point 61 of its tether 60 into the turn 17, the tether 60 is still relaxed and the link 23 pulls the even paddle $50_2$ until it passes beyond vertical and swings toward the flow of water $F_E$. The flow of water $F_E$ than causes the even paddle $50_2$ to swing toward conformance with the direction of flow. Once the link 23 moves onto the down-streaming straightaway 11, the distance between the link 23 and the connection point 61 of the tether 60 increases.

When both the link 23 and the connection point 61 are on the down-streaming straightaway 11, the flow of water $F_E$ will have brought the even paddle $50_2$ into its maximal resistance orientation.

For flow of water $F_E$ in the direction seen in FIG. 14, the tethers 60 of the odd paddles $50_{1-11}$ are always relaxed. When on the down-swinging straightaway 11, the flow of water $F_E$ causes them to swing toward conformance with the direction of flow. When on the up-stream straightaway 13, they are at the idle angle 55 set by their links 23. This completes one cycle C for two paddles $50_1$ and $50_2$ of the fixed-paddle turbine 400 with flow of water in the direction $F_E$.

The bidirectional hinged-paddle turbine 400 of FIGS. 13-16 is intended to be operated with the up-streaming straightaway 13 of the conveyor 10 generally parallel to the surface of the reversing tidal flows of water $F_O$ or $F_E$. In either direction of flow, some paddles travelling on the down-streaming straightaway 11 will be in the downward extending high resistance orientation entirely in the flow of water $F_O$ or $F_E$ and all paddles on the up-streaming straightaway 13 will be in a collapsed low resistance orientation at least partly out of the water.

In the power-generating mode of operation, in either direction of flow F, the force applied by the downstream flow of water F to the paddles 50 in the high resistance orientation is the greater than the force applied by the downstream flow of water F to the paddles 50 in the low resistance orientation. The force differential drives the paddles 50 on the down-streaming straightaway 11 and continuously propels the conveyor chains 20 to travel along the endless conveyor path.

In the power-generating mode of operation, when the tide changes direction the conveyor 10 travels in the opposite direction. The PTO shaft S still transfers energy from the turbine 400 to the power harnessing device (not shown).

Buoyancy Control Attachments

Adjustable buoyancy facilitates towing or self-deployment of the turbine from shore to site and also control of the depth at which the turbine operates, whether floating on the surface, resting on bottom or at any depth in between. Furthermore, floating turbines rise and fall with the tide and can be maintained by the buoyancy control system at an elevation at which components of the conveyor structure and add-on components such as drive motors can be protected from constant disposition in the water and can be more easily maintained and replaced.

Looking now at FIGS. 17-22, the buoyancy of the turbine can be controlled using various configurations of buoyancy modules 70, such as one or more polyethylene tubes 71 or tanks 73 attached to the turbine frame 40 by brackets 75. Typically, water can be pumped into or evacuated from the buoyancy modules 70 to provide the desired buoyancy.

As seen in FIG. 17, the unidirectional hinged-paddle turbine 200 of FIGS. 7-12 is in a horizontal conveyor orientation and has a buoyancy control horizontal tank 73 extending over the conveyor 10. The tank 73 is attached to the frame 40 by brackets 75 spacing the tank 73 above the paddles 50 on the up-streaming straightaway 13.

As seen in FIG. 18, the unidirectional hinged-paddle turbine 200 of FIGS. 7-12 is in a horizontal conveyor orientation and has two sets of three vertically stacked buoyancy control tubes 71, one set attached to each side of the frame 40 by brackets 75 and extending along the length of the conveyor 10. Also as seen in FIG. 20, the ends of the tubes 71 can manifolded to permit buoyancy altering media to be pumped into or evacuated from each tube separately, affording precise adjustments of the depth of the turbine in the water.

As seen in FIGS. 19 and 20, the unidirectional hinged-paddle turbine 200 of FIGS. 7-11 is in a vertical conveyor orientation and has one set of seven horizontally side-by-side tubes 71 attached to the upper surface of the frame 40 by brackets 75 and extending above and across the turbine 200.

As seen in FIGS. 21 and 22, the bidirectional hinged-paddle turbine 400 of FIGS. 13-16 is in a vertical conveyor orientation and has seven tubes 71 in a horizontal side-by-side array attached to the frame 40 by brackets 75.

Tubes 71, tanks 73 or combinations thereof can be custom arranged to create a level control system capable of containing a sufficient quantity of buoyancy or ballast medium to level the turbine at a predetermined elevation in the flow of water. Custom brackets 75 can be configured to connect the level control system to the frame 40 of the turbine.

The desired medium may be pumped from an independent source (not shown). Ballast medium can be used to stop the turbine from riding on top of the water or to allow the turbine to remain level when in operation and heavy ballast medium can be used to sink the turbine to the seabed for operation when positioned on the stand. Flotation medium can be used to keep major aspects of the turbine such as external motors used in the deployment of the turbine out of the water, to allow components of the turbine to be installed, removed or replaced, to simplify maintenance of the turbine, and to cause the turbine to rise and fall with the changing water level due to the changes in the tide.

Protective Shrouds

Continuing to look at FIGS. 21 and 22, the efficiency of any hinged-paddle turbine can be enhanced by adding a shroud 65 to the frame 40 to shield the up-streaming paddles 50 against direct attack by the downstream flow of water F. The shroud 65 can be used with both horizontal and vertical conveyor shaft turbines. Fixed-paddle turbines may also be used in below-surface applications if a shroud shields the fixed paddles on the up-streaming straightaway from direct attack by the flow of water.

In the example of FIGS. 21 and 22, the shroud 65 is used with a bidirectional hinged-paddle vertical conveyor shaft turbine, such as the turbine 400 illustrated in FIGS. 13 and 14 but in a horizontal conveyor shaft orientation. The use of the shroud 65 is especially significant in cooperation with horizontal or vertical bidirectional hinged-paddle turbines because their tethers 60 are attached to alternate paddles 50 hinged to swing in opposite directions. The shroud 65 reduces the possibility that the tethers 60, when in a relaxed condition, might be entangled. Use of the shroud 65 enables use of bidirectional hinged-paddle turbines 400 at any water depth from surface to the bottom.

Legs

Looking at FIGS. 4, 5, 7, 9-10, 12-14, 17-18 and 23-25, for horizontal conveyor turbines two vertical legs 80 each have vertical members 81 extending downward from the side panels 45 of the interior frame modules 41 to transverse base members 82. The vertical members 81 are sufficiently long to support the turbine above the water bed (not shown) when the transverse base members 82 rest on the water bed. The legs 80 can be filled with ballast to assist in stabilizing a turbine resting on the water bed, to prevent the turbine from riding on a surface of the flow of water, to tend to level the turbine in the flow of water or to allow the turbine to remain operational in very shallow waters.

Looking at FIGS. 19-22, for vertical conveyor turbines at least two, and as shown three, parallel generally horizontal legs 83 are spaced along the length of the turbine. Each leg 83 has a lower horizontal segment 84 extending from the top of an upright segment 85 seated on the water bed (not shown). The lower horizontal segment 84 is attached to the lower interior side panel 45 of the frame 40. A higher horizontal segment 86 extends from the lower horizontal segment 84 below and beyond the width of the turbine to another upright segment 87. The upright segments 85 and 87 are sufficiently long to support the turbine above the water bed and the horizontal segment 86 is sufficiently long to cantilever the turbine from the lower horizontal segment 84.

Environmentally Friendly Cover

While the turbine is unobtrusive in both its surface and subsurface operations, FIGS. 23 and 24 show, as an example, the unidirectional hinged-paddle turbine 200 of FIG. 7 with an optional cover 90 attached to the frame 40. The cover 90 spans above the hinged paddles 50 on the upper-streaming straightaway 13 from a point upstream of the downstream sprocket assembly 30 to a point downstream of the swing of the paddle 50 entering the upstream turn 17 of the conveyor 10. The cover 90 shown is a flat sheet and gives the turbine the appearance of an island. Grass, bushes, trees and other environmentally compatible adornments (not shown) can be added on the top of the cover to make the turbine blend into the surroundings.

Increased-How-Rate Cowling

Figure 25:
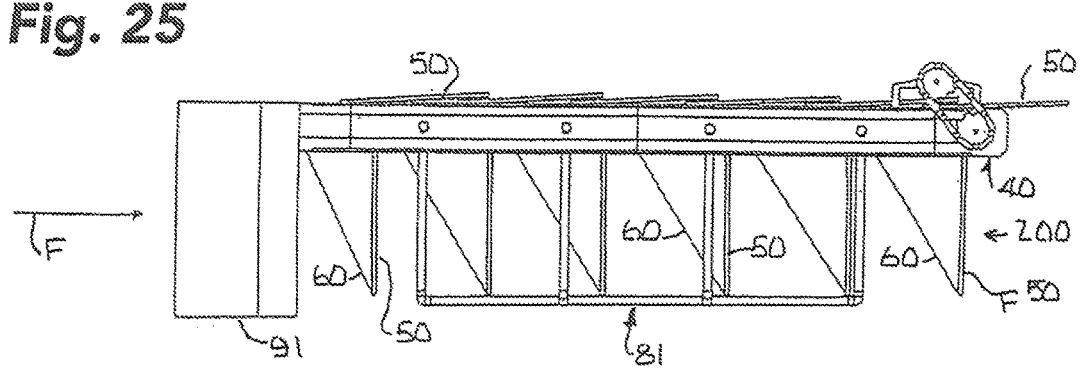
FIG. 25 is a front elevation view of the hinged-paddle water-driven turbine of FIG. 7 with a water-flow directing cowling added.
Figure 26:
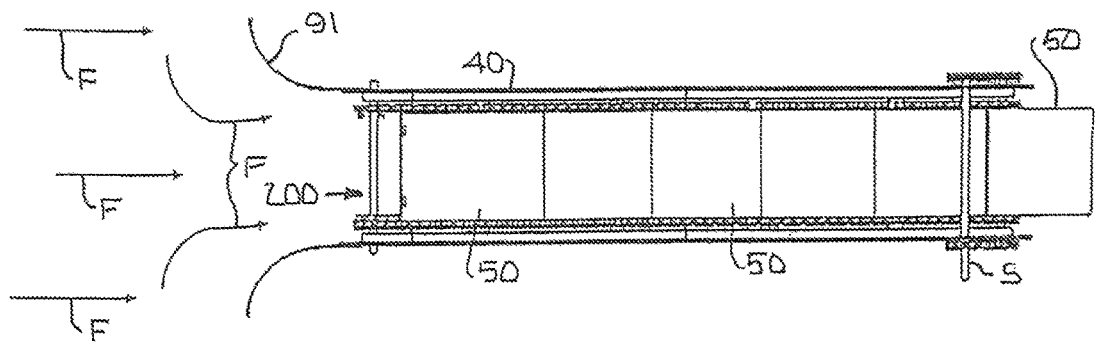
FIG. 26 is a side elevation view of the hinged-paddle water-driven turbine of FIG. 25.

Turning to FIGS. 25 and 26, the unidirectional hinged-paddle turbine 200 of FIG. 7 has a flow-directing cowling 91 attached to the downstream end of the frame 40. The exemplary cowling 91 shown flares outwardly arcuately to direct a wider portion of the upstream flow of water F toward the paddles 50. The resulting increased rate of flow F past the paddles 50 increases turbine power generating efficiency.

Increased-Flow-Rate Channel

Figure 27:
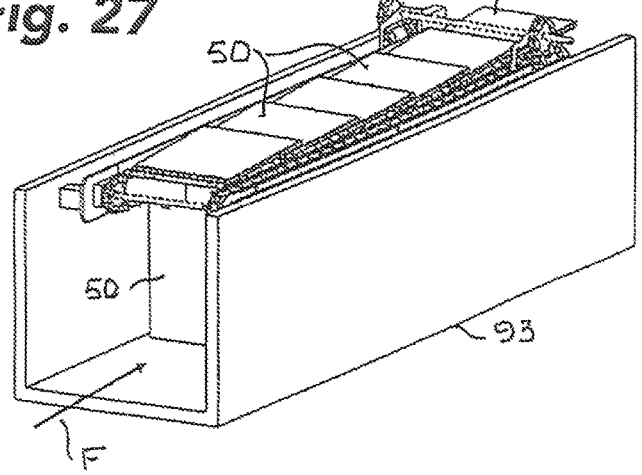
FIG. 27 is a front right top perspective view of the hinged-paddle water-driven turbine of FIG. 7 mounted in a water-flow confining channel.
Figure 28:
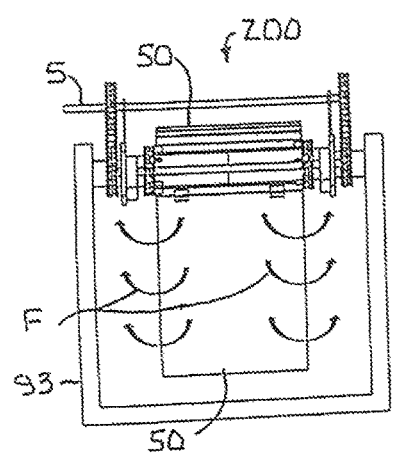
FIG. 28 is a side elevation view of the hinged paddle water-driven turbine of FIG. 27.

Looking now at FIGS. 27 and 28, the unidirectional hinged-paddle turbine 200 of FIG. 7 is mounted in a water-flow confining channel 93 that can be used at any depth from flotation to seabed. As water flows into the channel 93 toward the upstream faces of the paddles 50, the flow of water F escaping the paddle surface is not dissipated into the body of water. Rather, the flow of water to the sides of the paddles 50 increases the rate of flow and the turbine power generating efficiency.

Mooring

Figure 29:
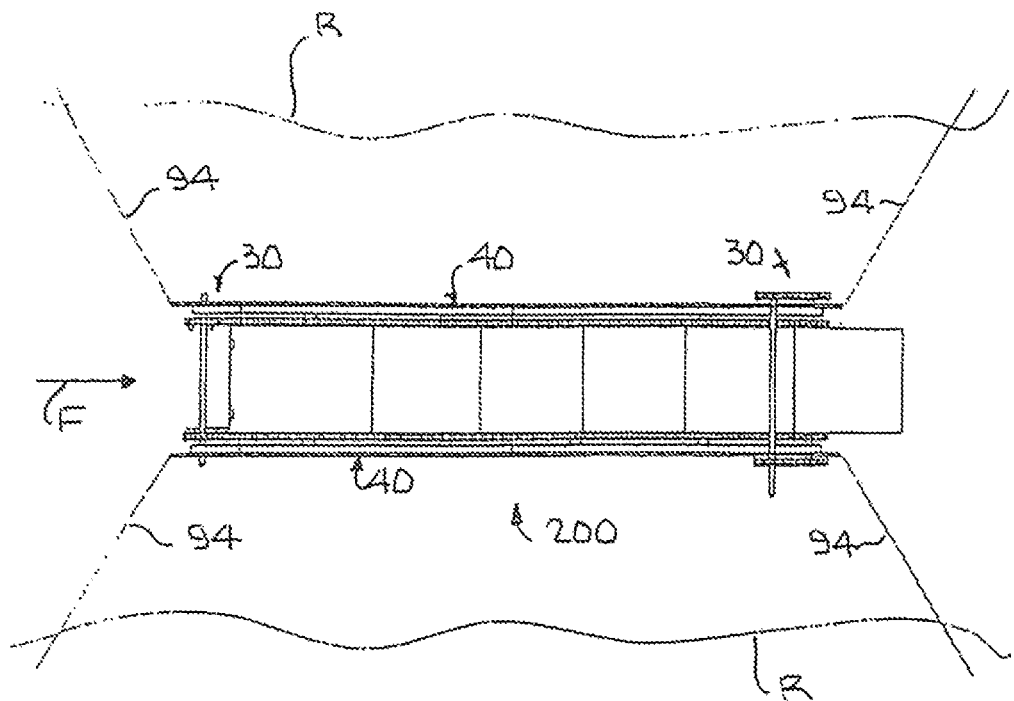
FIG. 29 is a top plan view of the hinged-paddle water-driven turbine of FIG. 7 moored to a riverbank by a four-point system.
Figure 30:
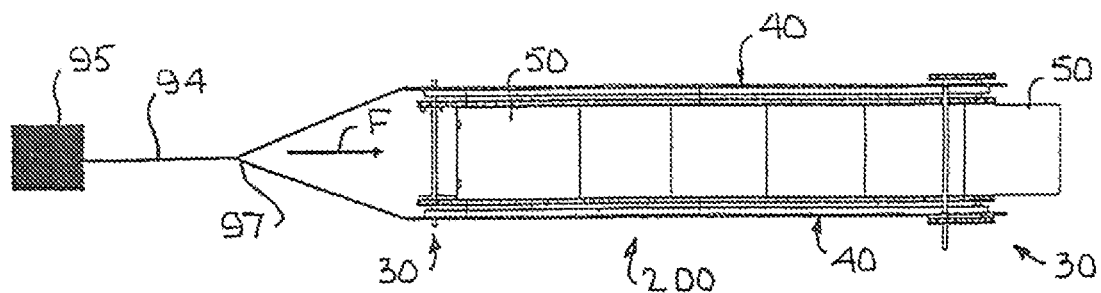
FIG. 30 is a top plan view of the hinged-paddle water-driven turbine of FIG. 7 moored by a single-point system.

Using the turbine 200 of FIG. 7 as an example and as seen in FIG. 29, a turbine can be positioned in an appropriate direction in a flow of water F by use of multiple independently adjustable mooring lines 94. The number of lines 94 depends on the waterway geographics, the loads applied and the nature of the current. When positioning the turbine in a river R as shown, the mooring lines 94 can initially be independently adjusted to take the turbine from the riverbank to the center of the flow of water F. Alternatively, as seen in FIG. 30, the turbine 200 can be positioned in an appropriate direction in the flow of water F by use of a single point swinging mooring line 94, as shown anchored 95 at its upstream end and yoked 97 at its downstream end to the upstream end of the turbine frame 40.

Method of Deploying and Using Elongated Conveyor Turbines

In accordance with the invention, the energy of flowing water can be converted into electrical energy using an elongated endless conveyor with spaced apart paddles.

Outwardly extending spaced-apart paddles of shape, size and angle of attack suitable to convert water-flow energy into electrical energy are fixed to the elongated endless conveyor. The conveyor is longitudinally aligned in a flow of water at an elevation at which the paddles, when extending upwardly from the conveyor, are at least partially above a surface of the flow of water. The conveyor is secured in the aligned orientation. The flow of water is allowed to propel downwardly extending paddles in the downstream direction to turn the endless conveyor. If moored in a tidal or otherwise reversing flow of water, bidirectional flow of water can be harnessed.

Alternatively, a plurality of spaced-apart paddles of shape, size and angle of attack suitable to convert water-flow energy into electrical energy are hinged at intervals to the elongated endless conveyor. The swing of the hinged paddles is limited within high and low resistance orientations in response to downstream and upstream movement of the paddles, respectively, in relation to the flow of water. The conveyor is aligned longitudinally in the flow of water. The hinged paddles may be aligned at an elevation at which they extend, when on an up-streaming straightaway of the conveyor, at least partly above a surface of the flow of water within the low resistance orientations and, when on a down-streaming straightaway of the conveyor, extend fully into the flow of water within the high resistance orientations. Alternatively, the hinged paddles may be aligned at an elevation at which they are fully in the flow of water. The aligned conveyor is secured in the aligned orientation. The flow of water is allowed to propel the paddles on the down-streaming straightaway of the conveyor to turn the endless conveyor.

Alternatively, a plurality of spaced-apart paddles of shape, size and angle of attack suitable to convert water-flow energy into electrical energy are hinged at intervals to the elongated endless conveyor. Alternate paddles are oppositely hinged so that odd paddles swing in one direction and the even paddles swing in the opposite direction. In one direction of flow of water, all of the even paddles are in idle or low resistance orientations and in an opposite direction of flow of water, all of the odd paddles are in idle or low resistance orientations. In one direction of flow of water, the odd paddles drive the conveyor and in the opposite direction of flow of water, the even paddles drive the conveyor. Given the availability of paddles in high resistance orientations in either direction of flow, the operation of the alternate paddle arrangement is substantially as described in relation to the non-alternate paddle arrangement.

In accordance with the invention, the conveyor may be deployed by towing, by crawling or by use of adjustable mooring lines. Crawling by the conveyor to a selected flow of water requires initially fixing to the conveyor paddles of shape, size and angle of attack suitable to cause the conveyor to crawl from one location to another and then driving the conveyor by use of an external power source. Paddles can be replaced on the conveyor at any location at any time by other paddles of shape, size and angle of attack suitable to deploy the conveyor or to enable the conveyor to convert water-flow energy into electrical energy. Using adjustable mooring lines to deploy the conveyor requires attaching a multi-point mooring system with corresponding independently adjustable mooring lines to a frame of the conveyor and adjusting the mooring lines to guide the conveyor to its intended location. The mooring line method of deployment is especially useful to transport the turbine from shore to a unidirectional flow of water such as a river or a reversing flow of water such as a tidal channel.

The paddles may be fixed or hinged to the conveyor spaced at equal or varying intervals along the conveyor as may be suitable to efficiency in the deployment or energy-conversion modes of operation of the conveyor.

To align the conveyor at an elevation at which the paddles, when extending upwardly from the conveyor, are at least partially above the surface of the flow of water or to align the conveyor at an elevation at which paddles are fully in the flow of water, either a flotation medium or a ballast medium is injected into a level control module attached to a frame of the conveyor to set the elevation and the quantity of the injected medium is varied to change the elevation of the conveyor in the flow of water.

For securing the conveyor, a multi-point mooring system with corresponding independently adjustable mooring lines may be attached to a frame of the conveyor. By independently adjusting the mooring lines the conveyor can be secured in the flow of water. If a mooring system is used for deployment, the same mooring system may be used for securing the conveyor. Alternatively, a single point swinging mooring line may be attached to the conveyor to maintain the conveyor in a direction of tidal flow.

Closing Observations

A brake, such as an electronic brake built into the PTO (not shown) or a mechanical pen (not shown) operable to lock the sprockets, can be activated to prevent rotation of the conveyor when the exertion of extreme water forces might damage the turbine, during routine maintenance or when installing or removing paddles or replacing turbine-crawling paddles with power-generating paddles.

Multiple conveyors may be combined in a single turbine. Individual or groups of the conveyors may be independently selectively locked against or unlocked for operation in specific applications. They may be configured to rotate in different directions and/or at different times depending upon the direction of the flow of water. They may be equipped with paddles of different size, shape or angle of attack or at different spacing to accommodate changing environmental and flow conditions.

Flow-directing cowlings, such as those illustrated in FIGS. 25 and 26, can be used in combination with water-flow confining channels, such as those illustrated in FIGS. 27 and 28.

The elongated straightaways 11 and 13 of the conveyor 10 permit more than one paddle 50 to be simultaneously propelled in a flow of water F so as to optimize driven paddle area. The increased paddle area translates into efficiency of operation even in lower velocity flows of water.

The use of hinged paddles that swing to a substantially minimal resistance orientation on the return or up-streaming straightaway allow the elongated straightaway turbine to operate with greater efficiency than other devices. Use of two drive chains allows maximum torque to be generated and extracted and power can be exported from the turbine through a mooring chain, an electrical cable or a mechanical PTO system.

Because it targets the mass of water rather than the water velocity, the elongated straightaway turbine is useful in a greater number of locations than other water-driven devices. While shallow waters often have a slower flow of tidal currents, a water depth of only one meter will allow the elongated straightaway turbine to generate significantly more energy than known devices operating at the same depth. And the elongated straightaway turbine is specially effective in tidal areas that have a large volume of water travelling through them at a moderate velocity rather than a moderate volume of water at a high velocity.

The turbine can operate as a fully floating structure having little or no impact on the seabed. Floating debris will not have any significant impact on the turbine because debris will be able to pass through the device as it flows through the water. The turbine is fish and mammal friendly and cavitation free because it operates at the same velocity as the flow of water.

Thus, it is apparent that there has been provided, in accordance with the invention, a water-driven turbine and method of using the water-driven turbine that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, is intended to embrace all such alternatives, modifications and variations as fall within the spirit of the appended claims.

What is claimed is:

1. A turbine for use in a flow of water, the turbine comprising:
    an elongated endless conveyor with down-streaming and up-streaming straightaways; and
    paddles spaced along and hinged to said conveyor to swing between high resistance orientations when on said down-streaming straightaway and low resistance orientations when on said up-streaming straightaway whereby, when in any of said high resistance orientations, said paddles are driven downstream by the flow of water and cause said endless conveyor to travel along said down-streaming and upstreaming straightaways, each said paddle being independently interchangeable with a replacement paddle having at least one of a different shape, size and angle of attack.

2. A turbine for use in a flow of water, the turbine comprising:
    an elongated endless conveyor with down-streaming and up-streaming straightaways;
    paddles spaced along and hinged to said conveyor to swing between high resistance orientations when on said down-streaming straightaway and low resistance orientations when on said up-streaming straightaway whereby, when in any of said high resistance orientations, said
    paddles are driven downstream by the flow of water and cause said endless conveyor to travel along said down-streaming and upstreaming straightaways; and
    ballast-filled legs preventing the turbine from riding on a surface of the flow of water and tending to level the turbine in the flow of water.

3. A turbine for use in a flow of water, the turbine comprising:
    an elongated endless conveyor with down-streaming and up-streaming straightaways;
    paddles spaced along and hinged to said conveyor to swing between high resistance orientations when on said down-streaming straightaway and low resistance orientations when on said up-streaming straightaway whereby, when in any of said high resistance orientations, said paddles are driven downstream by the flow of water and cause said endless conveyor to travel along said down-streaming and upstreaming straightaways; and
    independent tethers connected between corresponding ones of said paddles and said conveyor to prevent their corresponding said paddles from swinging beyond a maximal high resistance orientation when on said down-streaming straightaway.

* * * * *